(12) United States Patent
Oh

(10) Patent No.: US 7,780,131 B2
(45) Date of Patent: Aug. 24, 2010

(54) MOUNTING SYSTEM CAPABLE OF REPOSITIONING AN APPARATUS RELATIVE TO A REFERENCE PLANE

(75) Inventor: Sung Oh, West Covina, CA (US)

(73) Assignee: CLO Systems, LLC, City of Industry, CA (US)

( * ) Notice: Subject to any disclaimer, the term of this patent is extended or adjusted under 35 U.S.C. 154(b) by 711 days.

(21) Appl. No.: 11/397,202

(22) Filed: Apr. 4, 2006

(65) Prior Publication Data

US 2006/0219856 A1 Oct. 5, 2006

Related U.S. Application Data

(60) Provisional application No. 60/668,538, filed on Apr. 4, 2005, provisional application No. 60/684,132, filed on May 23, 2005, provisional application No. 60/714,571, filed on Sep. 7, 2005, provisional application No. 60/756,414, filed on Jan. 4, 2006.

(51) Int. Cl.
*E04G 3/00* (2006.01)

(52) U.S. Cl. ............. 248/276.1; 248/917; 248/919; 248/923

(58) Field of Classification Search ......... 248/917–923, 248/200, 220.21, 274.1, 276.1, 287.1
See application file for complete search history.

(56) References Cited

U.S. PATENT DOCUMENTS

| | | | |
|---|---|---|---|
| 1,498,813 A | 6/1924 | Sankela et al. | |
| 4,025,053 A | 5/1977 | Stickle, Jr. | |
| 4,203,636 A | 5/1980 | Wells | |
| 4,712,653 A | 12/1987 | Franklin et al. | |
| 4,720,805 A | 1/1988 | Vye | |
| 4,959,645 A | 9/1990 | O'Neil | |
| 5,124,805 A | 6/1992 | Chung et al. | |
| 5,261,645 A | 11/1993 | Huffman | |
| 5,321,579 A | 6/1994 | Brown et al. | |
| 5,366,203 A | 11/1994 | Huffman | |
| 5,474,376 A | 12/1995 | Saunders | |
| 5,525,019 A | 6/1996 | Moore et al. | |
| 5,583,735 A | 12/1996 | Pease et al. | |
| 5,592,724 A | 1/1997 | Linville et al. | |

(Continued)

FOREIGN PATENT DOCUMENTS

CH 653 464 A5 12/1985

(Continued)

OTHER PUBLICATIONS

Dave Coleman—Sport Compact Car Technobabble: Multilink and the Beam, published Nov. 1998.

(Continued)

*Primary Examiner*—Amy J Sterling

(57) ABSTRACT

A motorized mounting system includes a plurality of actuators that extend the distal ends of the plurality of actuators in a substantially horizontal manner. The distal ends of the plurality of actuators are adapted to couple to the backside of the monitor. The distal ends of the plurality of actuators define a plane such that extending or retracting at least one of the distal ends adjust the orientation of the plane relative to the reference plane, thereby adjusting the viewing angle of the monitor. The motorized mounting system can be controlled with a remote control.

19 Claims, 24 Drawing Sheets

U.S. PATENT DOCUMENTS

| | | | |
|---|---|---|---|
| 5,618,995 | A | 4/1997 | Otto et al. |
| 5,634,622 | A | 6/1997 | Pye |
| 5,668,570 | A | 9/1997 | Ditzik |
| 5,694,864 | A | 12/1997 | Langewellpott |
| 5,715,138 | A | 2/1998 | Choi |
| 6,095,476 | A | 8/2000 | Mathis |
| 6,109,395 | A | 8/2000 | Storm |
| 6,149,253 | A | 11/2000 | Talasani |
| 6,152,410 | A | 11/2000 | Mark |
| 6,170,408 | B1 | 1/2001 | Gombrich |
| 6,186,279 | B1 | 2/2001 | Blocker |
| 6,257,372 | B1 | 7/2001 | Schirmer |
| 6,288,891 | B1 | 9/2001 | Hasegawa et al. |
| 6,354,550 | B2 | 3/2002 | Jeong |
| 6,357,768 | B1 | 3/2002 | Chan et al. |
| 6,384,875 | B2 | 5/2002 | Bertagna |
| 6,419,196 | B1 | 7/2002 | Sweere et al. |
| 6,484,993 | B2 | 11/2002 | Huffman |
| 6,526,611 | B2 | 3/2003 | Flynn et al. |
| 6,532,147 | B1 | 3/2003 | Christ, Jr. |
| 6,554,242 | B2 | 4/2003 | Kim |
| 6,585,214 | B1 | 7/2003 | Dittmer |
| 6,586,854 | B1 | 7/2003 | Nozawa et al. |
| 6,604,722 | B1 | 8/2003 | Tan |
| 6,619,960 | B1 | 9/2003 | Horn |
| 6,633,276 | B1 | 10/2003 | Jaynes |
| 6,633,286 | B1 | 10/2003 | Do et al. |
| 6,637,818 | B2 | 10/2003 | Williams |
| 6,655,645 | B1 | 12/2003 | Lu et al. |
| 6,679,479 | B1 | 1/2004 | Watkins |
| 7,317,611 | B2 | 1/2008 | Dittmer |
| 2003/0080949 | A1 | 5/2003 | Ditzik |
| 2004/0075970 | A1 | 4/2004 | Einhorn et al. |
| 2004/0211870 | A1* | 10/2004 | Bremmon et al. ......... 248/284.1 |
| 2004/0232298 | A1* | 11/2004 | Bremmon et al. ...... 248/281.11 |
| 2005/0110911 | A1 | 5/2005 | Childrey et al. |

FOREIGN PATENT DOCUMENTS

| | | |
|---|---|---|
| DE | 102 24 764 A1 | 12/2002 |
| GB | 2370171 A | 6/2002 |
| JP | 08 312885 | 11/1996 |
| KR | 10-20040070521 A | 8/2004 |
| KR | 10-2005-0080139 A | 8/2005 |
| KR | 10-2005-0083030 A | 8/2005 |
| WO | WO2004051991 A | 6/2004 |

OTHER PUBLICATIONS

Whee-Kuk Kim and Byung Ju Yi—Analysis of Parallel Mechanisms with Forward Position Closed-Form Solution with Application to Hybrid Manipulator, published 1999.

Erard Motion—www.erard.com, no publication date.

INCA Corporation—"Plasma TV Motorized Wall Mounted Automatic Swivel with Tilt," no pub. date.

Title "Mechanism" from http://mysite.du.edu/~jcalvert/tech/machines/centro.htm, by J.B. Calvert. The above tilted Mechanism first created Dec. 24, 2003; and revised Dec. 2, 2005; see p. 6.

* cited by examiner

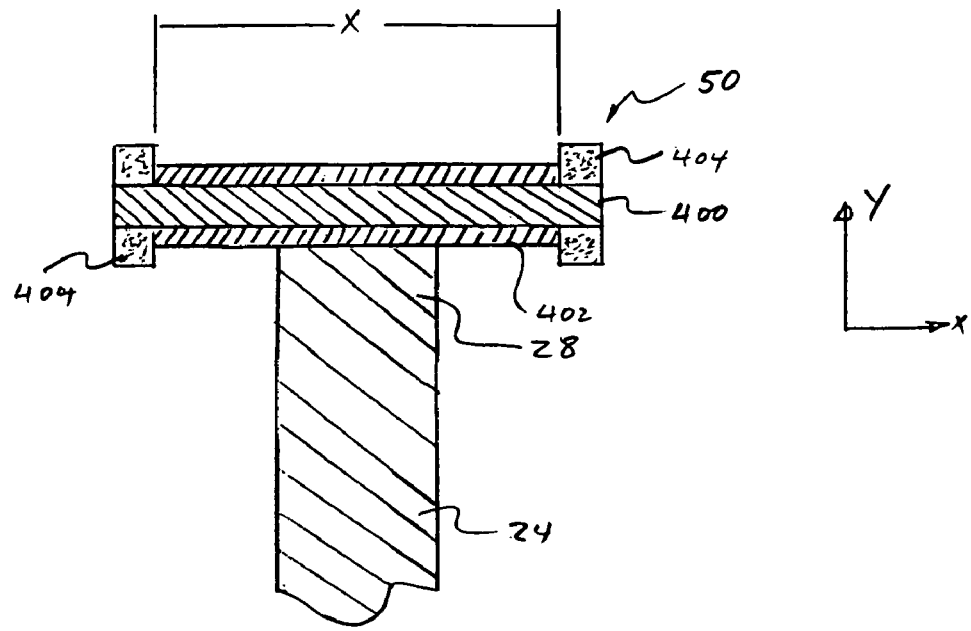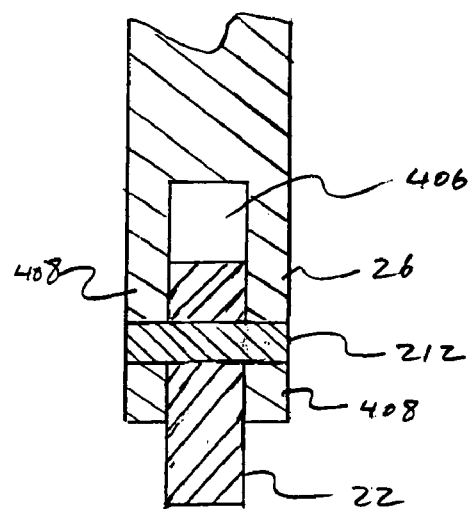
FIG. 4

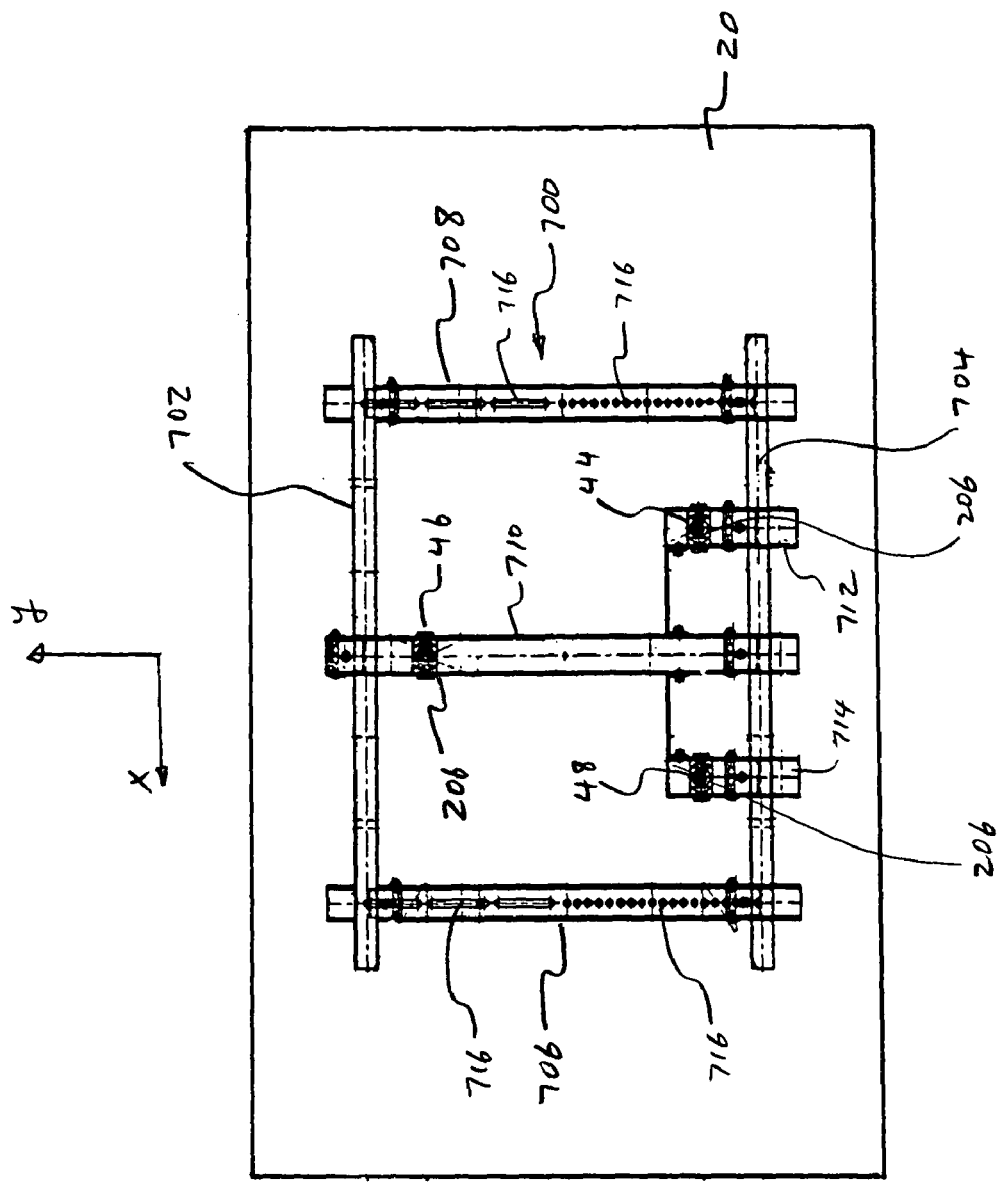

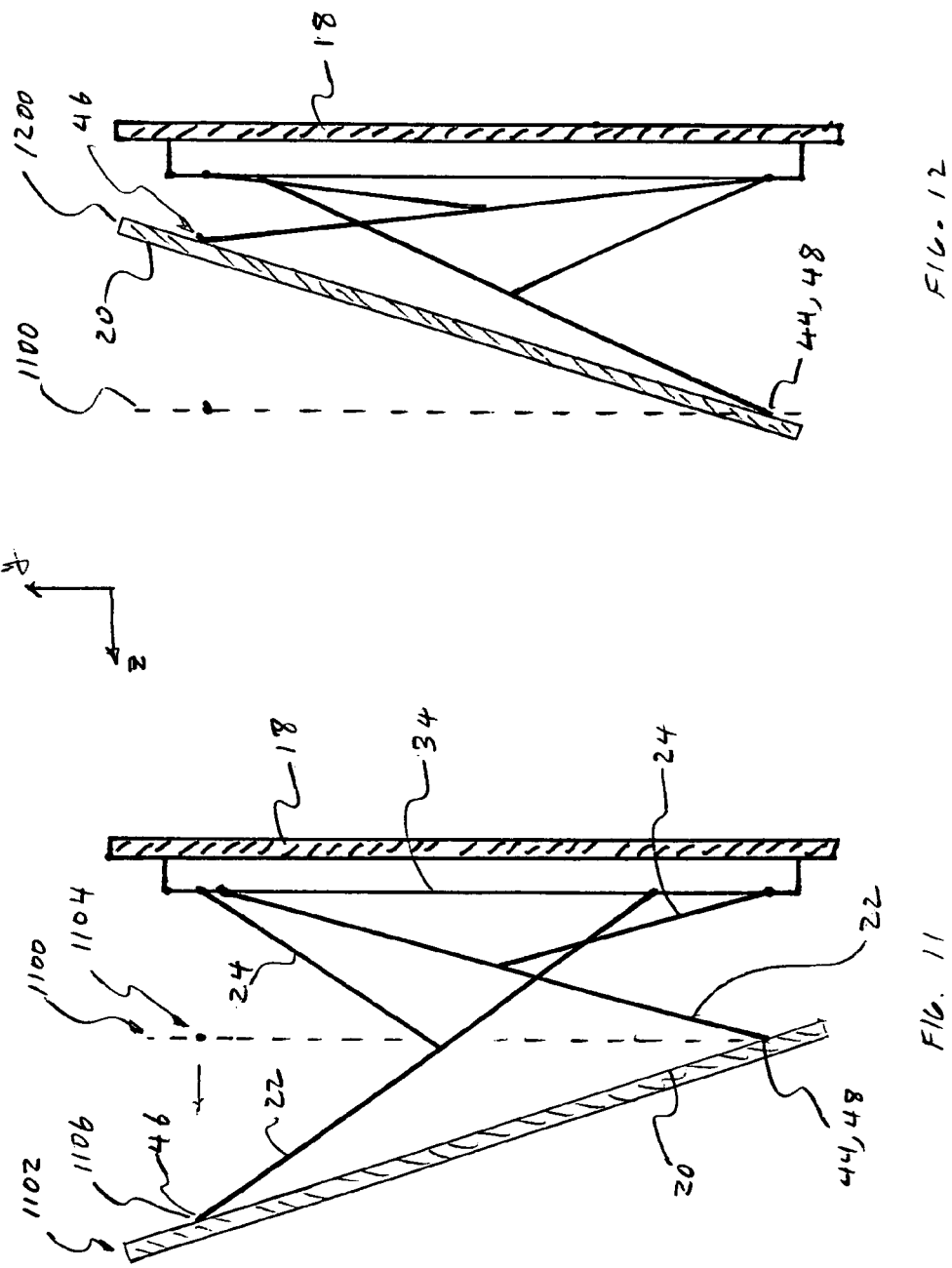

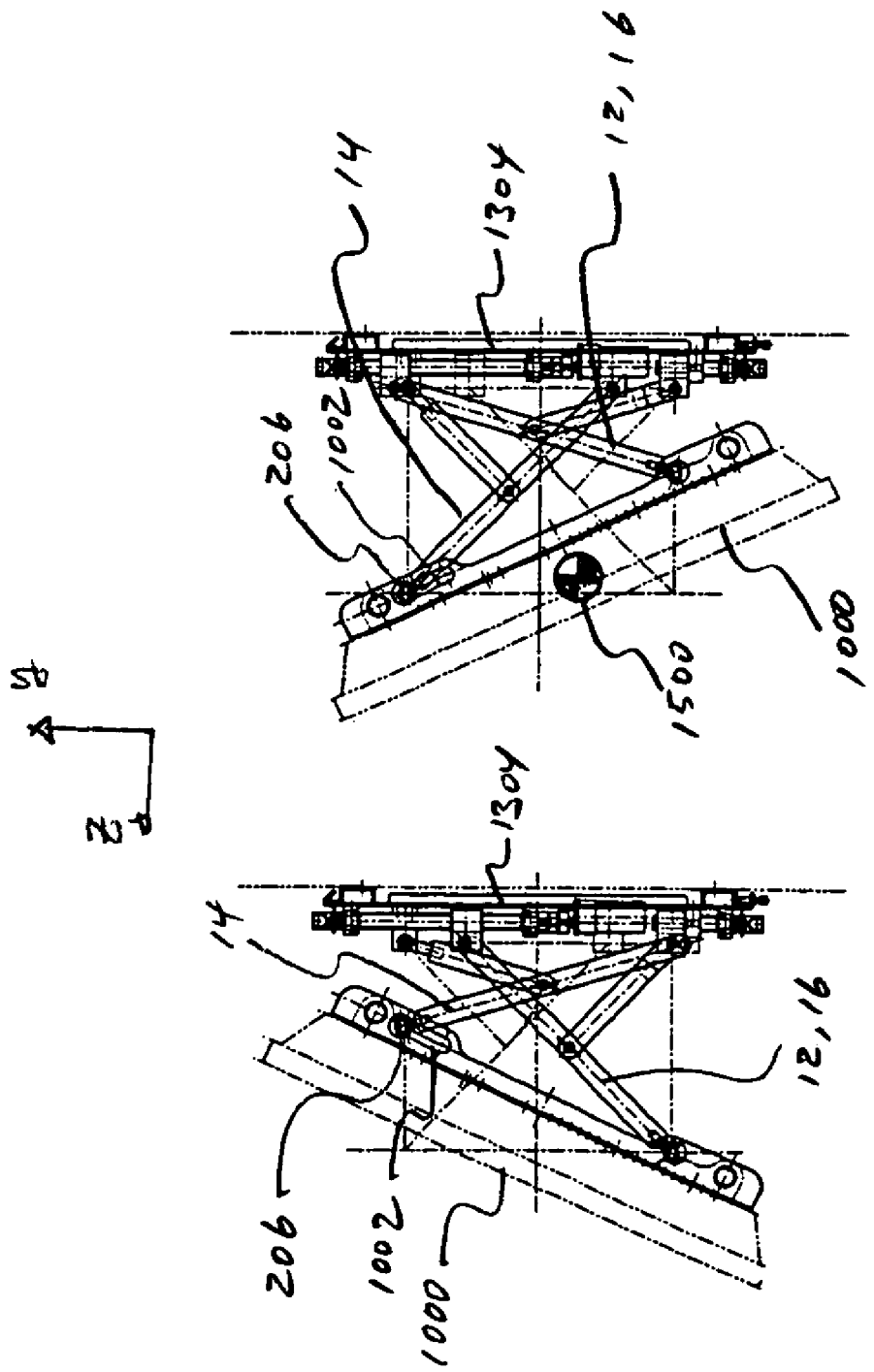

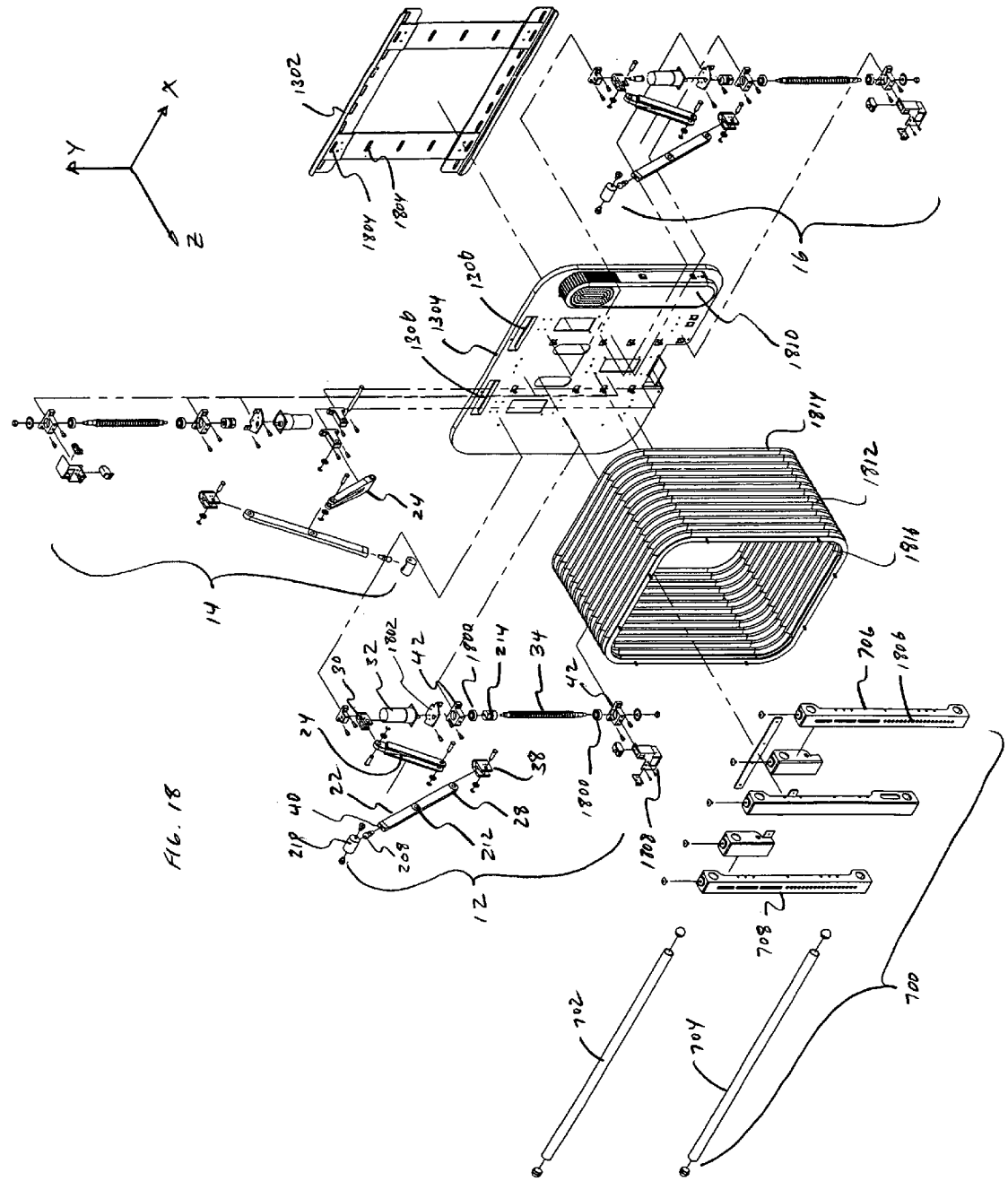

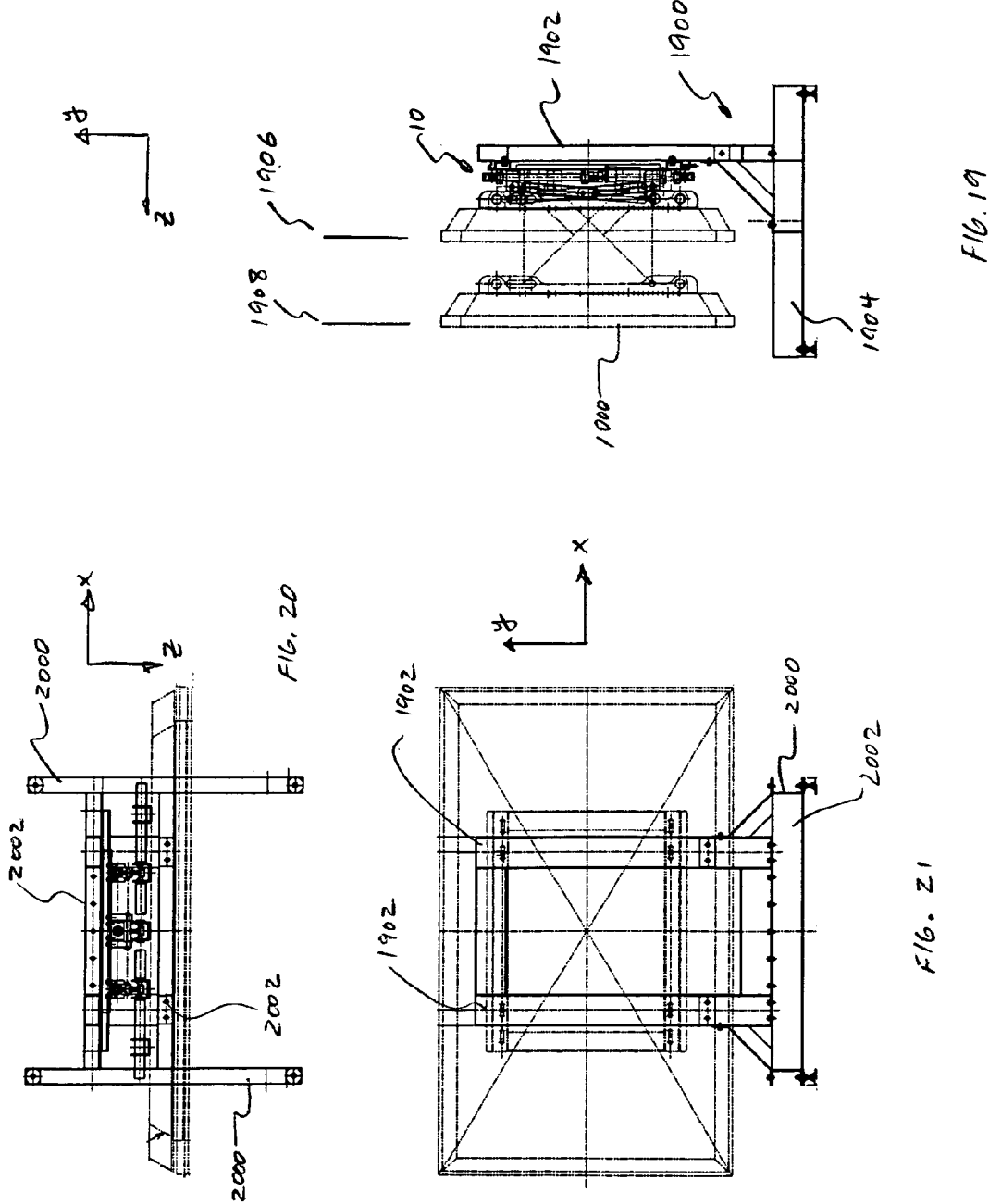

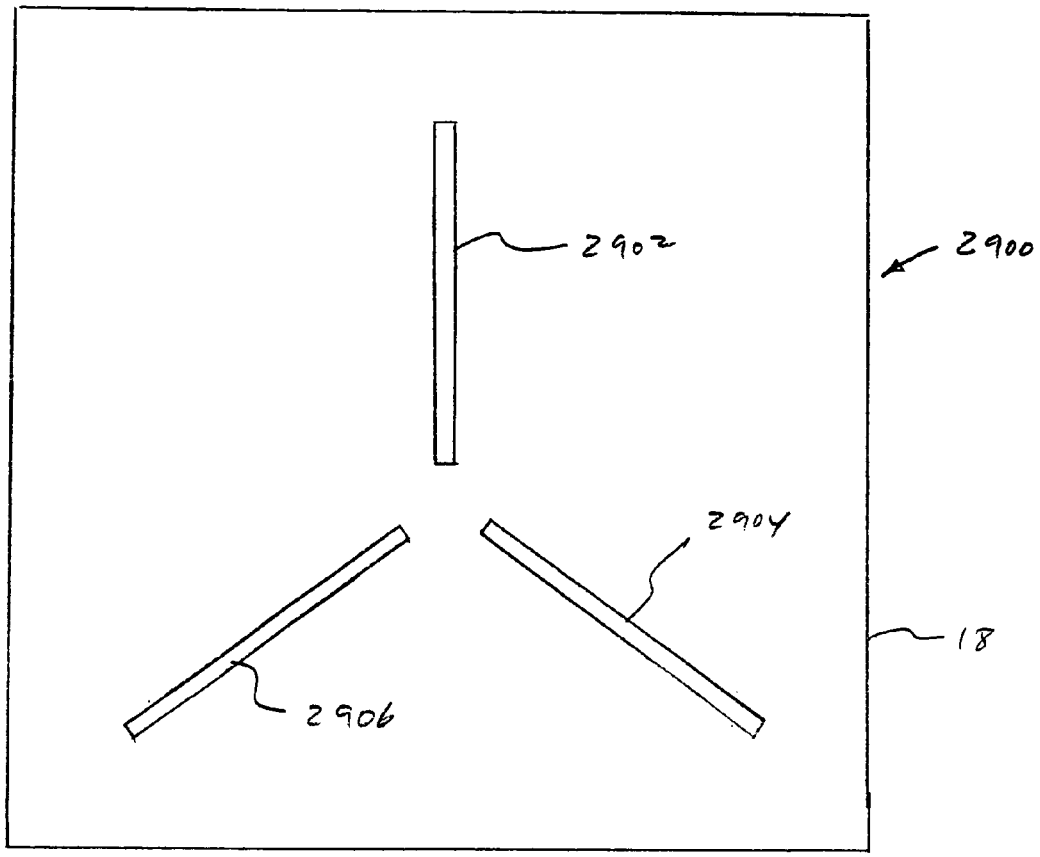
FIG. 29
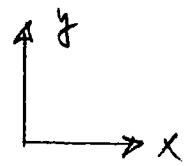

MOUNTING SYSTEM CAPABLE OF REPOSITIONING AN APPARATUS RELATIVE TO A REFERENCE PLANE

RELATED APPLICATIONS

This non-provisional application claims priority to the following provisional patent applications having Ser. Nos. (1) 60/668,538, filed Apr. 4, 2005; (2) 60/684,132, filed May 23, 2005; (3) 60/714,571, filed Sep. 7, 2005; and (4) 60/756,414, filed Jan. 4, 2006, which are all hereby incorporated by references.

FIELD OF THE INVENTION

This invention is directed to a mounting system capable of adjusting the position of an apparatus relative to a reference plane. In a particular application, the mounting system is capable of mounting a monitor to a surface, such as a wall, and adjusting the viewing angle of the monitor either manually or based on an input signal from a remote control.

BACKGROUND OF THE INVENTION

Flat panel monitors such as computer monitors, LCD, plasma, slim televisions, and the like (collectively referred to as "monitor(s)") are becoming popular because they can be mounted onto a wall to save floor space and for their aesthetically pleasing appearance. In particular, monitors are generally mounted to a wall with a mechanical support arm or a bracket, and then fixed in a desired orientation to maximize the viewing angle of the monitor. To later adjust the viewing angle of the monitor, however, a viewer generally tilts the monitor manually to a new viewing angle so that the viewer may more comfortably view the monitor from a different location or to deflect the glare on the monitor away from the viewer. For instance, a monitor may be fixed to a wall in a family room to allow the family members or one viewer to view the monitor at the desired viewing angle. As the viewer moves from one area to another area, such as from the family room to the kitchen, the viewer may not be able to view the monitor. In addition, in situations where the monitor is mounted in a remote location or high above the floor, such as above the fireplace mantle, it may be inconvenient for the viewer to adjust the viewing angle of the monitor.

Another limitation with the support arm is the weight limit the support arm can handle. That is, as the support arm is extended to support a monitor further away from the wall, the weight of the monitor applies bending load on the support arm. The bending load on the support arm increases as the distance between the monitor and the wall increases. Bending loads can apply extreme stress on the support arm. As such, with heavier monitors, support arms are not generally used. Rather, wall mounts are used to attach the heavier monitors substantially against a wall with the viewing angle fixed at a predetermined orientation. The wall mounts do allow for some tilting of the monitor but do not allow the monitor to be moved laterally or extend out from the wall. Accordingly, there is a need for a mounting system that can mount a larger and heavier monitor to a wall and allow the viewing angle of the monitor to be more easily adjusted.

SUMMARY OF THE INVENTION

This invention is directed to a mounting system capable of adjusting the orientation of an apparatus relative to a reference plane. In particular, the mounting system is designed to adjust the viewing angle of a flat panel television or monitor. In this application, the mounting system is adapted to couple to the backside of the monitor and mount to a wall. The mounting system may be remotely controlled to extend the monitor from the wall at a predetermined distance and may swivel (side to side) and/or tilt (up and down) the monitor.

The mounting system includes a plurality of actuators that extend the distal ends of the plurality of actuators in a substantially horizontal manner. The distal ends of the plurality of actuators are adapted to couple to the backside of the monitor. The distal ends of the plurality of actuators define a plane such that extending or retracting at least one of the distal ends adjust the orientation of the plane relative to the reference plane, thereby adjusting the viewing angle of the monitor.

A mounting system may also be capable of repositioning an apparatus relative to a reference plane, the mounting system comprising: first, second, and third actuators between the apparatus and the reference plane, the second actuator between the first and third actuators, each of the first, second, and third actuators having a distal end adapted to extend and retract relative to the reference plane, the distal ends of the first, second, and third actuators forming a triangular configuration such that extending or retracting the second actuator tilts the apparatus up or down, and extending or retracting the first actuator and/or the third actuator swivels the apparatus side to side.

The invention may include a method of adjusting the viewing angle of a monitor having a thickness mounted to a vertical wall, the method comprising: supporting a backside of a monitor at first, second, and third locations forming a triangular configuration, the second location between the first and third locations; extending the monitor more than the thickness of the monitor from the vertical wall; tilting the monitor by extending or retracting the second location in a substantially perpendicular manner relative to a vertical wall; and swiveling the monitor by extending or retracting the first and third locations along a substantially horizontal plane.

The mounting system may be used in a variety of applications such as to adjust the viewing angle of a monitor. The mounting system may be also used in the billboard application as well where the billboard may be moved in accordance with the predetermined movements preprogrammed into a memory. In general, the mounting system may be used in applications where control movement between two surfaces is desired. The mounting system may be mounted to a floor or ceiling as well.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 4 shows a cross-sectional view of the link along the line 4 shown in FIG. 2.

FIG. 7 shows a bracket system adapted to pivotally couple the distal ends of the three actuators along their respective locations in the mounting surface.

FIG. 11 is a schematic side view of the mounting system of FIG. 1 to illustrate that the rotatable joint for the middle actuator slides along an elongated slot when the mounting system tilts downward.

FIG. 12 is a schematic side view of the mounting system of FIG. 1 to illustrate that the rotatable joint for the middle actuator slides along an elongated slot when the mounting system tilts upward.

FIG. 14 shows a side view of the mounting system supporting a monitor in a tilted upward position.

FIG. 15 shows a side view of the mounting system supporting a monitor in a tilted downward position.

FIG. 18 shows disassembled perspective view of the mounting system of FIG. 1 that has been inverted.

FIG. 19 is a side view of the mounting system attached to a stand.

FIG. 20 is a top view of the mounting system attached to the stand shown in FIG. 19.

FIG. 21 is a back view of the mounting system attached to the stand shown in FIG. 19.

FIG. 29 shows a top view of a schematic representation of a mounting system capable of leveling a substrate.

DETAIL DESCRIPTION OF THE INVENTION

Figure 1:
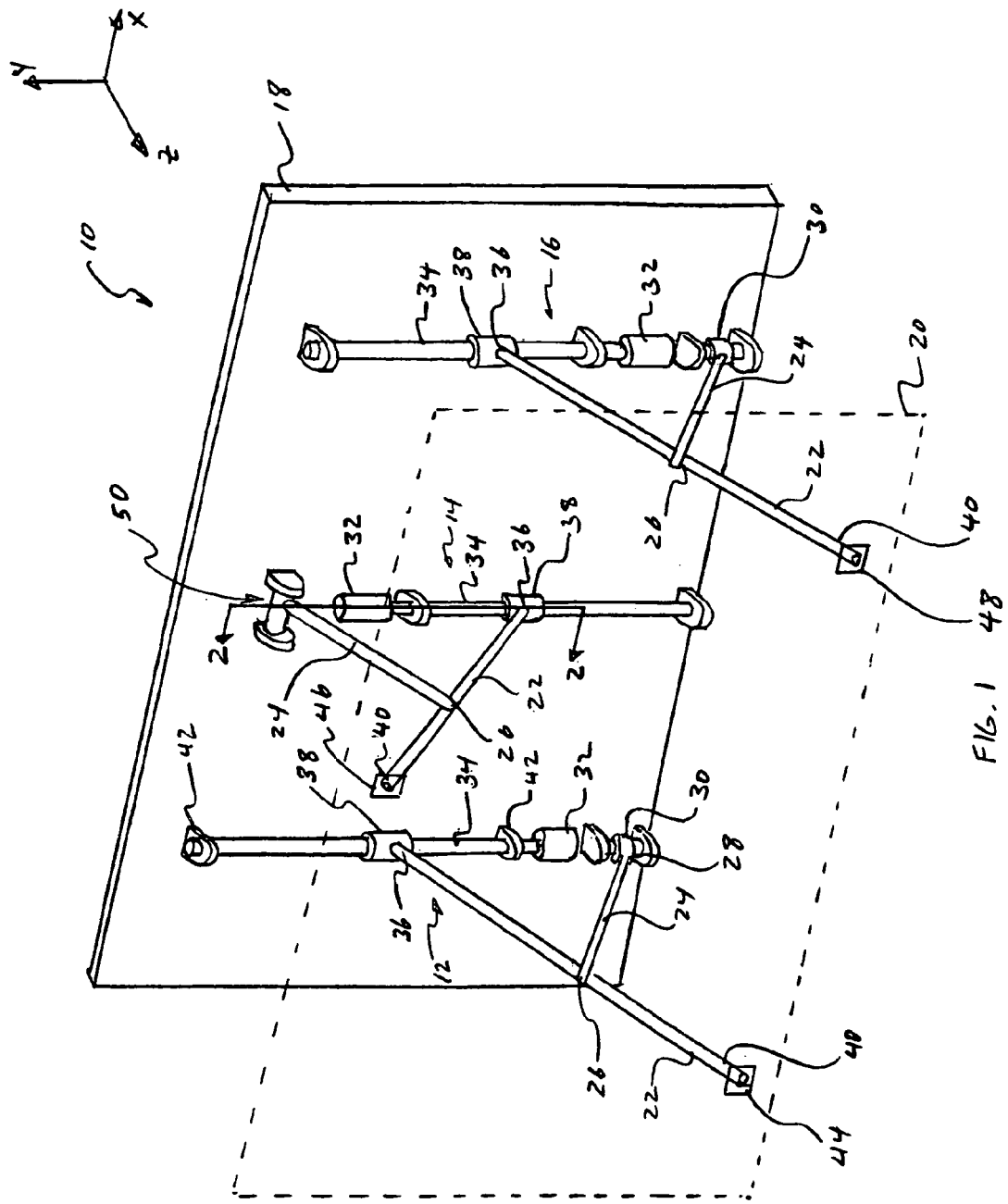
FIG. 1 shows a motorized mounting system in reference to X, Y, and Z axes.

FIG. 1 shows a perspective view of a mounting system 10 in reference to X, Y, and Z axes. The mounting system 10 includes a first actuator 12, a second actuator 14, and a third actuator 16 between a reference plane 18 and a mounting surface 20. The first and third actuators 12 and 16 may be substantially similar with respect to each other, with the second actuator 14 having a minor difference with the first and third actuators 12 and 16, as discussed in more detail below. The second actuator 14 is between the first and third actuators 12 and 16, and it is substantially inverted relative to the first and third actuators 12 and 16. The three actuators 12, 14, and 16 may be activated independently to extend, retract, swivel (side to side), and/or tilt (up and down) the mounting surface 20 relative to the reference plane 18, as explained in more detail below.

Each of the actuators may have a first link 22 and a second link 24. The second link 24 may be shorter or about one-half the length of the first link 22, and the distal end 26 of the second link 24 may be pivotally coupled to the first link 22 substantially along its midpoint. The proximal end 36 of the second link 24 is coupled to a universal joint 30 that is adapted to pivot about the Y-axis, as discussed in more detail below.

Each of the actuators may have a motor 32 that is coupled to a screw 34 to rotate the screw about its longitudinal axis. In this example, the motor 32 may be located substantially aligned with the longitudinal axes of its screw 34. In addition, the motor 32 may be located between the screw 34 and the universal pivot joint 30. The screw 34 may be supported by support brackets 42 to couple the screw to the reference plane 18.

The proximal end 36 of the first link 22 may be pivotally coupled to a sleeve 38. The sleeve 38 may be adapted to move or slide along the longitudinal axis of the screw 34 as the screw 34 is rotated by the motor 32. The sleeve 38 may have a threaded opening adapted to engage with the screw 34. As such, as the screw 34 rotates, the sleeve slides along the screw 34. The two sleeves 38 for the first and third actuators 12 and 16 may turn about the Y-axis around their respective screws. The sleeve 38 for the second actuator 14, however, may be substantially prevented from lateral or side to side movement by the hinge 50, as explained in more detail below. As the sleeve 38 slides along the screw 34, the distal end 40 of first link 22 extends or retracts relative to the reference plane 18 depending on the rotational direction of the screw 34. For instance, as the sleeve 38 for the first actuator 12 slides along the screw 34 in the positive Y-axis direction, the distal end 40 of the first actuator 12 retracts toward the reference plane 18. Conversely, as the sleeve 38 for the first actuator 12 slides along the screw 34 in the negative Y-axis direction, the distal end 40 of the first actuator 12 extends away form the reference plane 18.

Alternatively, the sleeve 38 may be motorized to move along the longitudinal axis of the screw 34 that is fixed. Note that any other apparatus or method known to one skilled in the art may be utilized to slide a sleeve along the shaft, screw, or any other line.

With the second actuator 14 inverted relative to the first and third actuators 12 and 16, the three distal ends 40 of the three actuators 12, 14, and 16 may form a triangular configuration with respect to each other. The three distal ends 40 of the three actuators 12, 14, and 16 may be adapted to rotate relative to the mounting surface 20 along the three locations 44, 46, and 48, respectively. By independently adjusting the distance between the three locations 44, 46, and 48 and the reference plane 18, the mounting surface 20 may be moved from a first position to a second position, where the second position may be extended, retracted, swiveled, and/or titled relative to the reference plane 18. For instance, by extending the location 46 relative to the locations 44 and 48, the mounting surface 20 may be tilted downward or tilted counter-clockwise about the YZ-plane; or by extending the location 44 and retracting the location 48, the mounting surface 20 may swivel in the counter-clockwise direction about the XZ-plane.

In one of many applications, the reference plane 18 may be adapted to couple to a wall and the mounting surface 20 may be adapted to couple to a monitor and a variety of apparatuses. Alternatively, the mounting surface 20 may be adapted to couple to a wall and the reference plane 18 may be adapted to couple to a monitor or a variety of apparatuses. As such, the reference plane 18 may be a fixed surface and the mounting surface 20 may be a movable surface; and, alternatively, the mounting surface 20 may be a fixed surface and the reference plane 18 may be a moveable surface.

Figure 2:
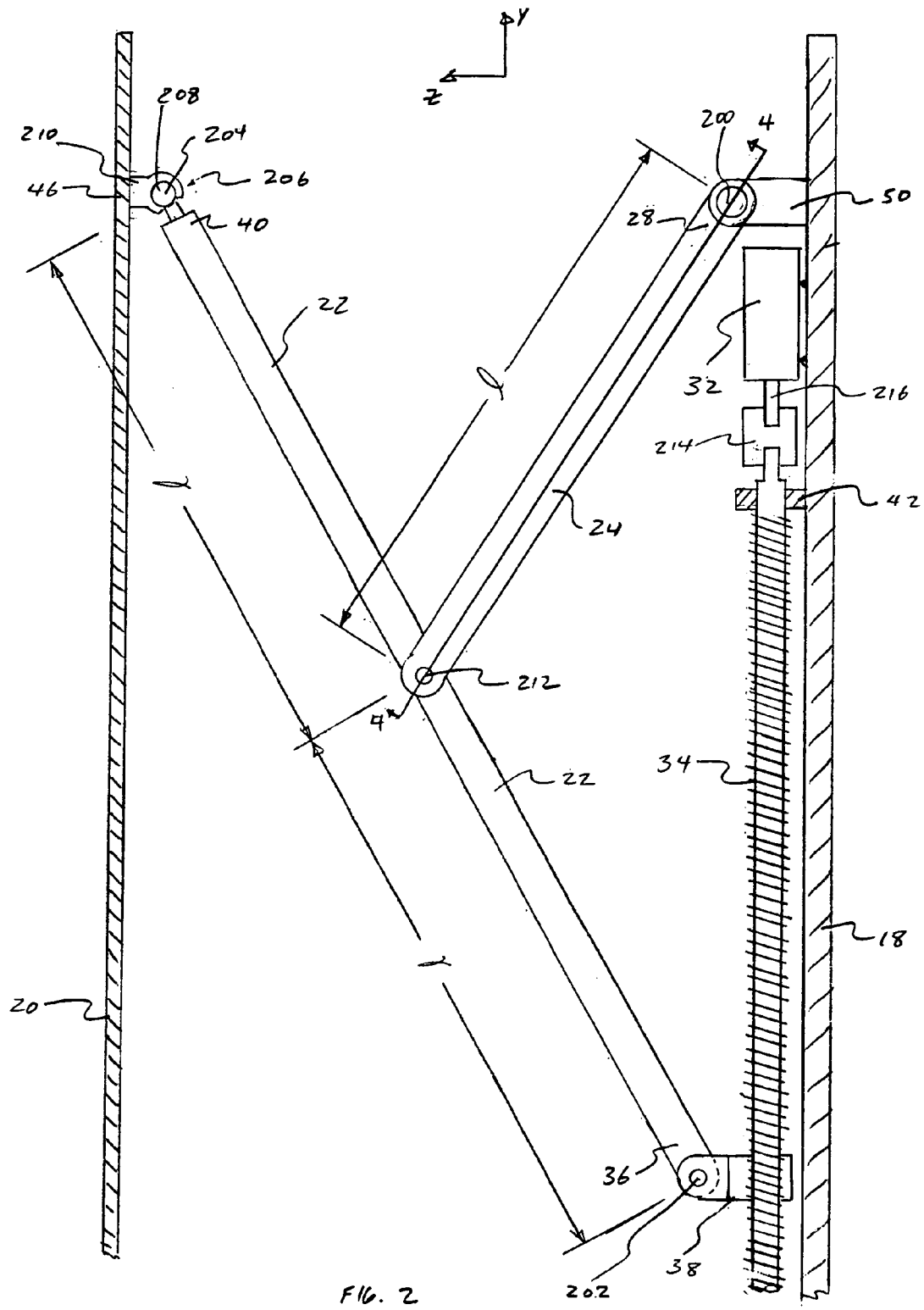
FIG. 2 is cross-sectional side view of the mounting system along the line 2 shown in FIG. 1.

FIG. 2 is cross-sectional side view of the mounting system 10 along the line 2 shown in FIG. 1. The proximal end 28 of the link 24 may pivot about a pivot point 200 relative to the hinge 50, as described in more detail below. The proximal end 28 of the link 22 may pivot about a pivot point 202 relative to the sleeve 38, and the distal end 40 of the link 22 may pivot about a pivot point 204. The pivot point 204 may be a rotatable joint 206, where the round head 208 is within a socket 210 to allow the round head 208 to rotate within the socket 210. The round head 208 may be coupled to the distal end 40 of the first link 22. The link 24 may be pivotably coupled to the link 22 at about its midpoint 212 between the pivot points 202 and 204. In addition, the length of the link 22, as defined by the distance between the two pivot points 202 and 204, may be about twice as long as the length of link 24, as defined by the distance between the two pivot points 200 and 212. This allows the mounting surface 20 to extend from the reference plain 18 substantially along the Z-axis with nominal, if any, movement along the Y-axis.

The screw 34 may be supported by one or support mounts 42. The support mounts 42 may be adapted to allow the screw 34 to rotate along its longitudinal axis or along the Y-axis. The motor 32 may be located between the hinge 50 and the screw 34 to turn the screw 34 in either direction. A flexible coupler 214 may couple the shaft 216 of the motor 32 to one end of the screw 34 to transfer the torque from the motor 32 to the screw 34. As the motor 32 rotates the screw 34, the sleeve 38 may move along the longitudinal axis of the screw 34 to extend or retract the distal end 40 of the link 22 relative to the reference plane 18.

Figure 3:
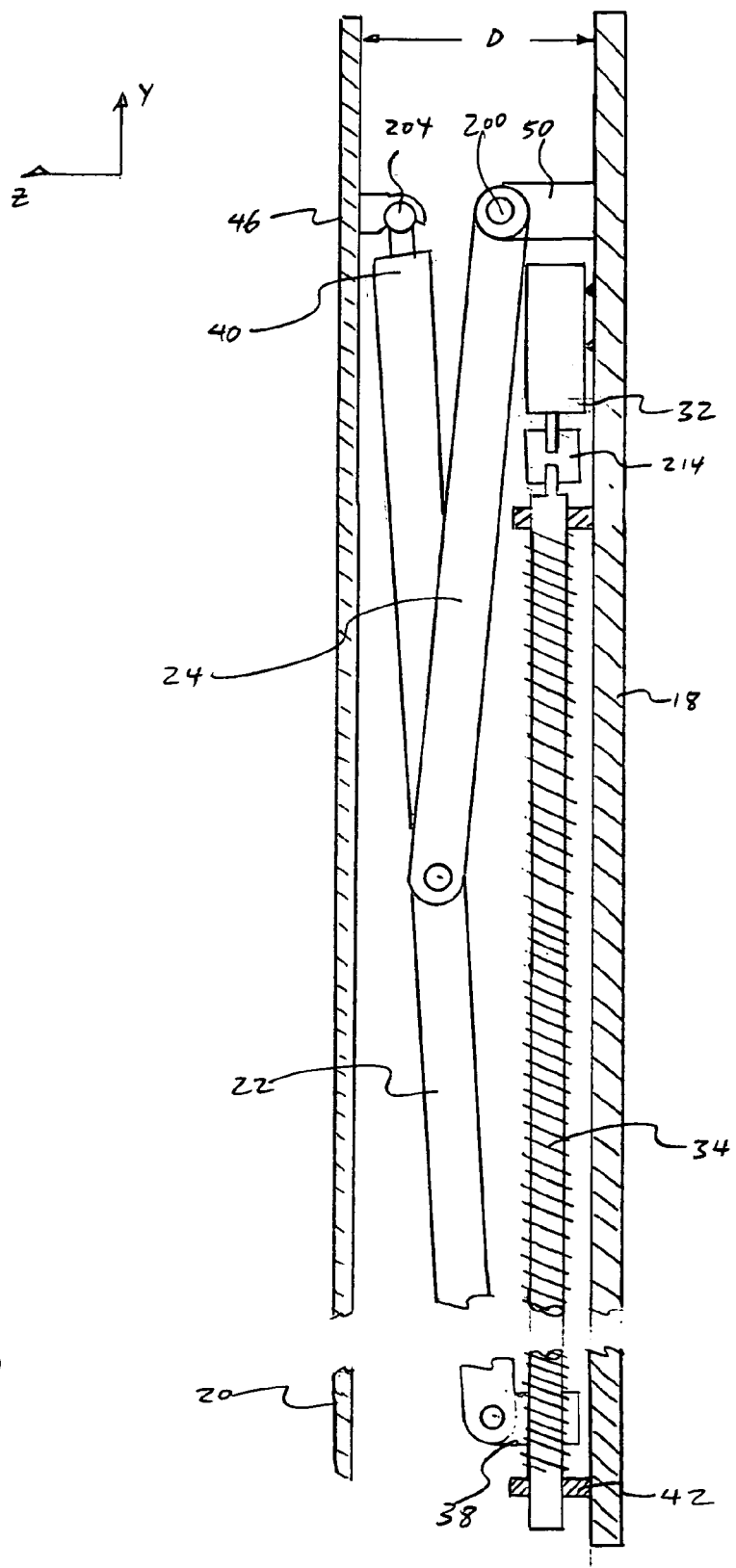
FIG. 3 shows a cross-sectional side view of the mounting system in a retracted position along the line 2 shown in FIG. 1.

FIG. 3 shows a cross-sectional side view of the mounting system 10 in a retracted position. The screw 34 and links 22 and 24 may be arranged to minimize the distance D between the reference plane 18 and the mounting surface 20. As the motor 32 turns the screw 34 to move the sleeve 38 in the positive Y-axis direction, the sleeve 38 applies force in the positive Y direction on the first link 22. The force on the link 22 causes the pivot point 204 to extend relative to the reference plane 18 substantially along the Z-axis with nominal, if any, movement along the Y-axis. In other words, if the reference plane 18 represents a wall, then the distal ends of the first link extend and retract is a substantially horizontal manner or along the XZ plane. This minimizes the torque needed from the motor 32 to extend or retract the weight of a monitor attached to the mounting surface 20 because the weight of the monitor is not lifted by the motor 32.

FIG. 4 shows a cross-sectional view of the link 24 along the line 4 shown in FIG. 2. The proximal end 28 of the second actuator 14 may be pivotally coupled to the hinge 50, and the distal end 26 of the link 24 may be pivotally coupled to the link 22 about the pivot point 212. The hinge 50 includes a pin 400 within a cylinder 402. In this example, the pin 400 may represent the pivot point 200. The pin 400 may be coupled to end caps 404 with the cylinder 402 between the end caps 404. The end caps 404 may be mounted to the reference plane 18. The longitudinal axis of the pin 400 may be substantially along the X-axis to allow the cylinder 402 to rotate or pivot about the X-axis. The pin 400 and the cylinder 402 may have a length X to resist the bending load applied to the cylinder. As such, with the above hinge 50 and link 24 configurations, the second actuator 14 may be substantially prevented from moving laterally in the X-axis direction so that the distal end 40 of the second actuator 14 moves substantially in a perpendicular manner relative to the reference plane 18, and the distal ends 40 of the first and third actuators 12 and 16 may extend or retract substantially along XZ plane or horizontal or a common plane.

The distal end 26 of the second link 24 may have a cut out 406 defined by two flanges 408 adapted to receive the link 22 between the two flanges 408. The pivot point 212 may be represented as a pin to pivotably couple the link 22 to the two flanges 408. The cut out 406 may have a sufficient gap to allow the link 22 to pivot within the cutout 406.

Figure 5:
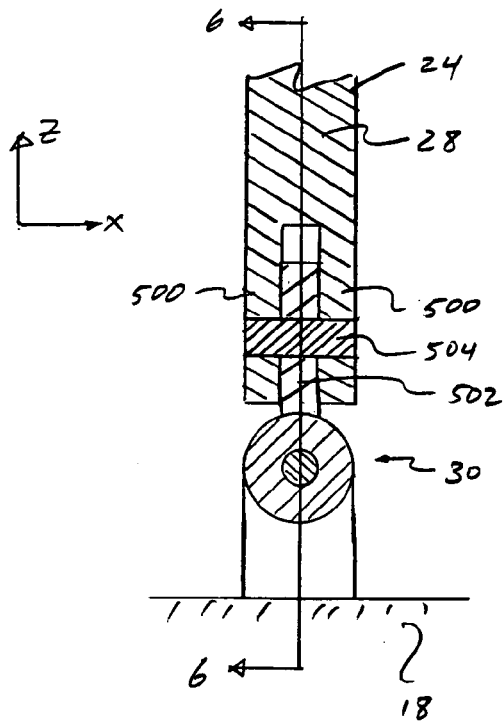
FIG. 5 shows a proximal end of a second link for one of the actuators pivotally coupled to its respective universal pivot joint.
Figure 6:
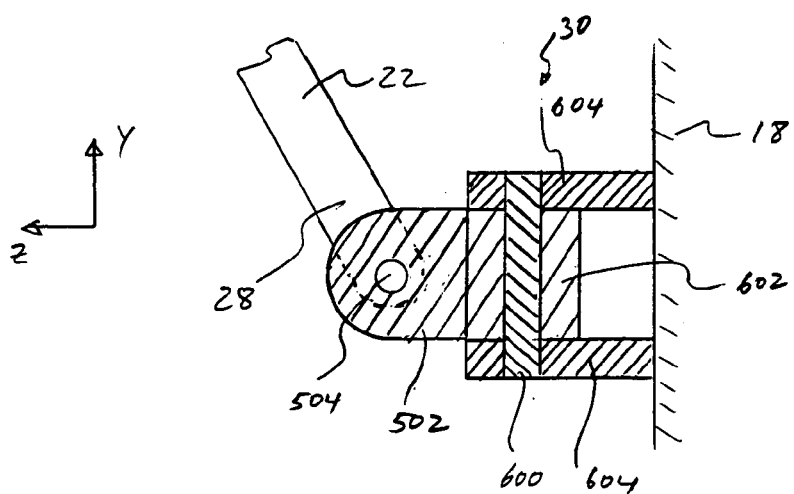
FIG. 6 shows a cross-sectional view of the universal pivot joint along the line 6 in FIG. 5.

FIGS. 5 and 6 show the proximal ends 28 of the second link 24 for the first and third actuators 12 and 16 pivotally coupled to their respective universal pivot joints 30. The proximal end 28 of the second link 24 may have two legs 500 adapted to receive a flange 502 therebetween. The two legs 500 and the flange 502 may be pivotably coupled to each other through a pin 504 to allow the proximal end 36 of the link 24 to pivot about the X-axis.

FIG. 6 shows a cross-sectional view of the universal pivot joint 30 along the line 6 in FIG. 5. The universal pivot joint 30 has a pin 600 within a cylinder 602. The pin 600 may be coupled to end caps 604 with the cylinder 602 between the end caps 604. The end caps 604 may be mounted to the reference plane 18. The longitudinal axis of the pin 600 may be substantially along the Y-axis to allow the cylinder 602 to rotate or pivot about the Y-axis. As such, as the mounting system 10 swivels the mounting surface 20 along the XZ-plane, the second links 24 for the first and third actuators 12 and 16 may pivot about their respective universal pivot joints 30 along the Y-axis.

FIG. 7 shows a bracket system 700 adapted to pivotally couple the distal ends 40 of the first, second, and third actuators 12, 14, and 16 to their respective locations 44, 46 and 48 on the mounting surface 20. The bracket system 700 includes a first bar 702 and a second bar 704 supported by a first bracket 706 and a second bracket 708. A third bracket 710 may be provided between the first and second brackets 706 and 708, and the third bracket 710 may be adapted to receive the first and second bars 702 and 704. A fourth bracket 712 may be provided between the second and third brackets 708 and 710; and a fifth bracket 714 may be provided between the first and third brackets 706 and 710. The fourth and fifth brackets 712 and 714 may be adapted to pivotally couple to the rotatable joints 206 at the locations 44 and 48 on the mounting surface 20. The third bracket 710 is adapted to pivotally couple the rotatable joint 206 at the location 46 on the mounting surface 20; and as discussed in more detail below, the rotatable joint 206 at the location 46 may slide along the Y-axis when the mounting surface 20 is being tilted.

The first and second brackets 706 and 708 may have one or more holes 716 adapted to receive one or more bolts that tighten with the provisions made in the mounting surface 20 such as threaded openings. The first and second brackets 706 and 708 may slide along the first and second bars 702 and 704 so that the bracket system 700 may be mounted to the mounted surface having the threaded openings in a variety of locations. This enables the mounting system 10 to be mounted to the mounting surface 20 so that the mounting system 10 may reposition the mounting surface 20 relative to the reference plane 18.

Figure 9:
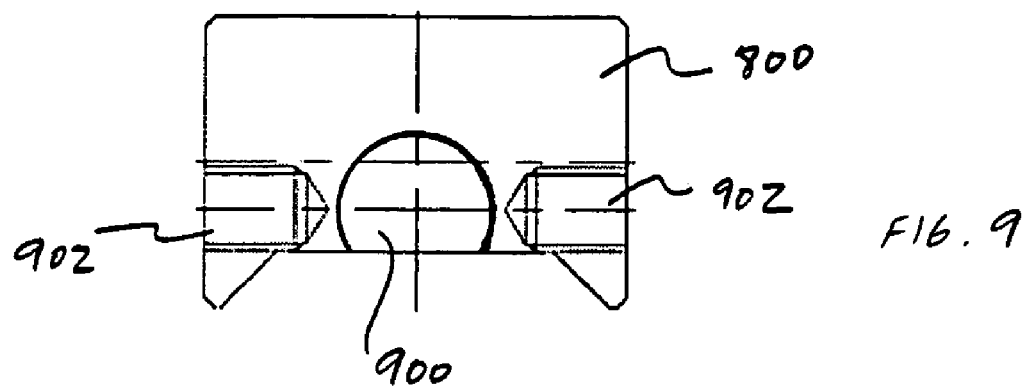
FIG. 9 shows a socket having a circular cavity adapted to receive the round head to rotate therein.
Figure 8:
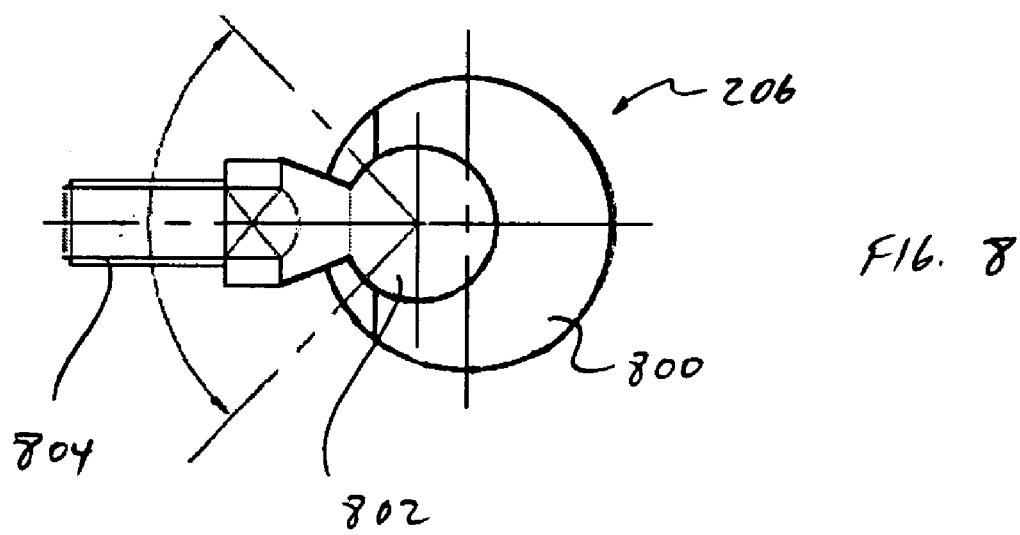
FIG. 8 shows a rotatable joint that may be used to pivot the distal ends of the three actuators.

FIG. 8 shows a rotatable joint 206 that may be used to pivot the distal ends 40 of the first, second, and third actuators 12, 14, and 16. The rotatable joint 206 includes a socket 800 adapted to house a round head 802. The round head 802 may also have a threaded portion 804 that attaches to the distal end 40 of the first link 22. FIG. 9 shows that the socket 800 may have a circular cavity 900 that allows the round head 802 to rotate therein. The socket 800 may have threaded openings 902 adapted to receive bolts to attach the rotatable joint 206 to the third, fourth, and fifth brackets 710, 712, and 714 at their respective locations 44, 46, and 48, as discussed above. The rotatable joint 206 may be coupled to their respective brackets such that the rotatable joint 206 may pivot about the longitudinal axis of the threaded opening 902.

Figure 10:
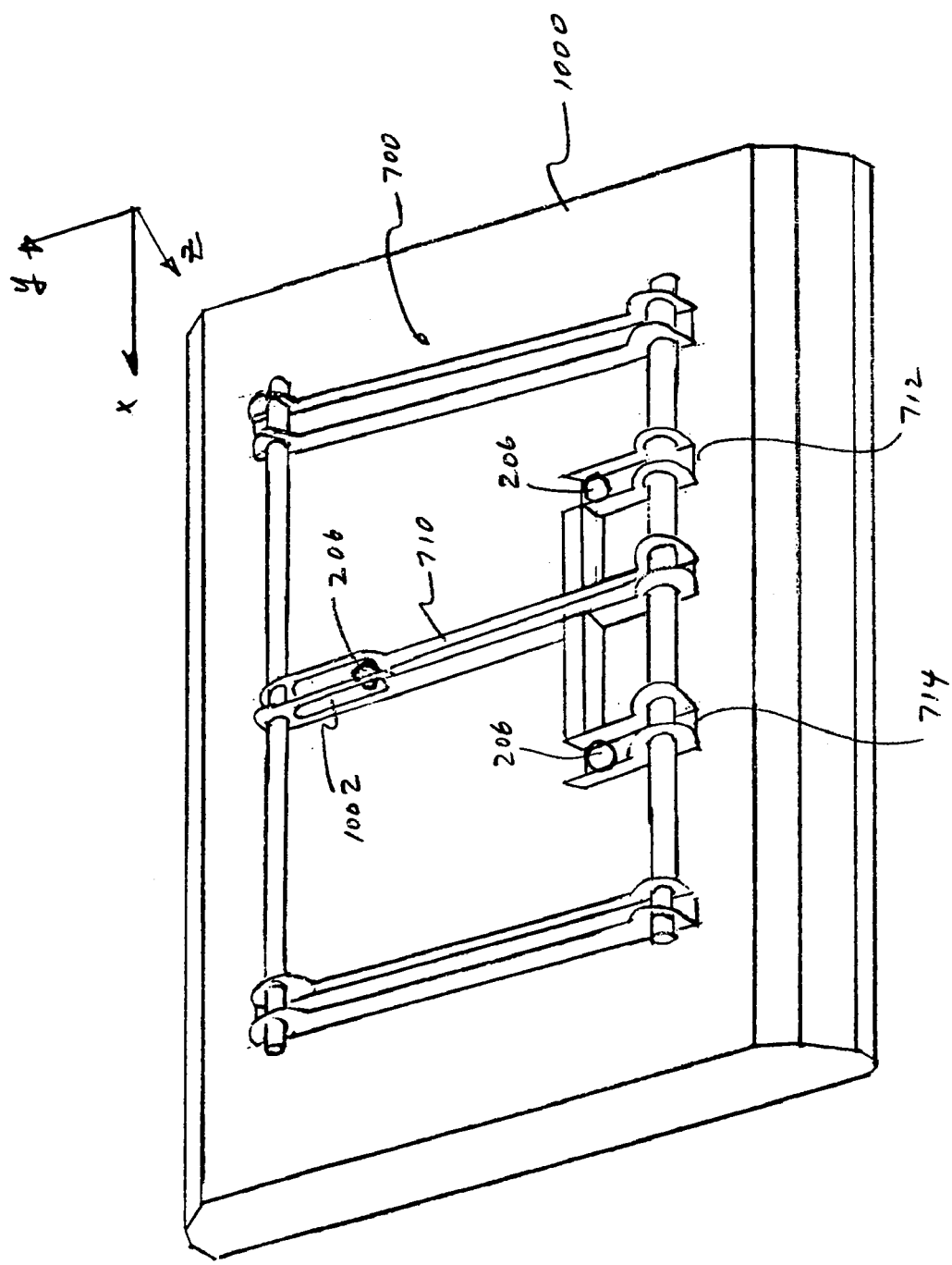
FIG. 10 is a perspective view of the bracket system attached to the backside of a monitor.

As an example, the mounting surface 20 may be the backside of a monitor in order to adjust the viewing angle of the monitor with the convenience of a remote control. FIG. 10 is a perspective view of the bracket system 700 attached to the backside of the monitor 1000. The third bracket 710 may have an elongated slot 1002 at one end adapted to receive the rotatable joint 206 and allow the pivot joint 902 to slide along the elongated slot 1002. This allows the distal end 40 of the second actuator to slide along the elongated slot 1002 as the mounting system 10 tilts the monitor 1000 up or down. The rotatable joints 206 coupled to the fourth and fifth brackets 712 and 714 may rotate about their respective longitudinal axis of the threaded opening 902 but may not slide. As such, the distal ends of the first, second, and third actuators 12, 14, and 16 may rotate about their respective locations 44, 46, and 48, and the rotatable joint 206 for the second actuator at the location 46 may slide along the elongated slot 1002. Alternatively, the elongated slots may be provided at the fourth and fifth brackets 712 and 714 and not at the third bracket 710 so that the distal ends of the first and third brackets slide along the fourth and fifth brackets and not at the third brackets. Note that it is within the scope of this invention to utilize a variety of bracket systems know to one skilled in the art. For instance, the mounting bracket 10 may be first attached to a wall and then the monitor 1000 may be attached to the bracket system 700.

FIGS. 11 and 12 show a schematic side view of the mounting system 10 to illustrate that the rotatable joint 206 for the second actuator 14 slides along the elongated slot 1002 when the mounting system 10 tilts the mounting surface 20. FIG. 11 shows the mounting surface 20 tilted in a counter-clockwise direction from a first position 1100 to a second position 1102 along the YZ-plane by extending the second actuator 14 further relative to the first and third actuators 12 and 16. In the first position 1100, the distal end 40 of the second actuator 14 is located at a location 1104; and in the second position, the distal end 40 of the second actuator 14 is located at a location 1106, which is in the positive Z direction with nominal, if any, movement in the X and Y axes. As such, the distance between the distal end 40 of the second actuator 14 and the distal ends of the first and third actuators 12 and 16 is longer in the second position 1102 than in the first position 1100. Likewise, FIG. 12 shows that when the mounting surface 20 is tilted in a clockwise direction from the first position 1100 to a third position 1200, the distance between the distal end 40 of the second actuator 14 and the distal ends of the first and third actuators 12 and 16 is longer in the second position 1200 than in the first position 1100.

In reference to FIG. 10, to allow the distal end 40 of the second actuator 14 to vary the distance between the distal ends 40 of the first and third actuators 12 and 16, and the distal end 40 of the second actuator 14 the rotatable joint 206 for the second actuator 14 is able to slide along the elongated slot 1002 of the third bracket 710. In this regard, the weight of the monitor 1000 is substantially supported by the first and third actuators 12 and 16; and the second actuator 14 may be extended or retracted relative the first and third actuators 12 and 16 or vice versa to tilt the monitor 1000 in the YZ plane.

Figure 13:
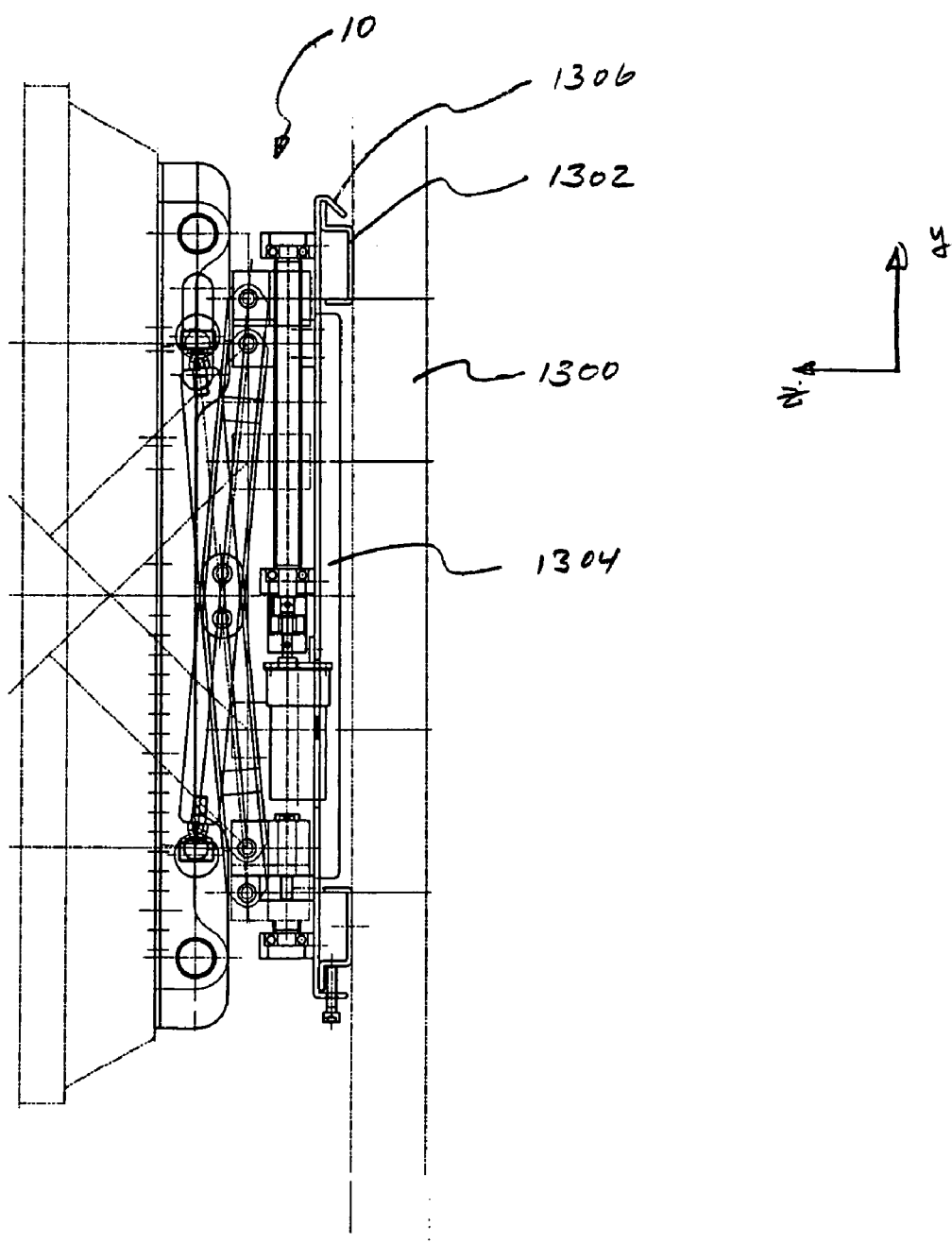
FIG. 13 shows a side view of the mounting system in a retracted position.

FIG. 13 shows a side view of the mounting system 10 in a retracted position. To couple the mounting system 10 to wooden studs 1300 within a wall, a wall bracket 1302 may be provided between the reference plane 18 and the wall where the mounting system 10 may be mounted. The wall bracket 1302 may be adapted to mount to the wooden studs 1300 within the wall. The wall bracket 1302 may have a plurality of holes so that at least a portion of the holes align with the wooden studs 1300, which are about 16 inches apart center to center, so that screws may be used to mount the wall bracket 1302 to the wall. Once the wall bracket 1302 is mounted to the wall, a base plate 1304, representing the reference plane 18, having one or more hooks 1306 may be placed over the wall bracket 1302 to attach the base plate 1304 to the wall bracket 1302.

FIG. 14 shows a side view of the mounting system 10 where the monitor 1000 is in a tilt upward position or in a clockwise direction along the YZ plane by extending the first and third actuators 12 and 16 further away from the base plate 1304 relative to the second actuator 14 along the Z-axis. Conversely, FIG. 15 shows the mounting system 10 where the monitor 1000 is in a tilt downward position or counter-clockwise direction along the YZ plane by extending the second actuator 14 from the base plate 1304 further along the Z-axis relative to the first and third actuators 12 and 16. Note that in FIGS. 14 and 15, the rotatable joint 206 is located at the upper part of the elongated slot 1002 indicating that the distance between the distal end 40 of the second actuator 14 is further away from the distal ends 40 of the first and third actuators 12 and 16 compared to when the monitor 1000 is substantially parallel with the base plate 1304.

Once the viewing angle of the monitor 1000 is fixed, the weight of the monitor 1000 coupled to the mounting system 10 is substantially carried by the three actuators 12, 14, and 16 as compression or tension load. As beams are better able to carry compression and tension loads versus bending loads, the mounting system 100 is able to carry more weight. For instance, referring back to FIG. 15, the center of gravity of the monitor 1000 attached to the mounting system 10 may be at a location 1500. The combined weight "W" of the monitor 1000 and the mounting system 10 is transferred to three actuators 12, 14, and 16. In this example, the first links 22 for the three actuators 12, 14, and 16 will be generally under tension load. That is, with the first links 22 having rotatable distal ends, there are minimal, if any, bending and/or torque loads on the first links. This allows the mounting system 10 to move the monitor 1000 further away from the first mounting surface 102 along the Z-axis without overstressing the first links 22.

Figure 16:
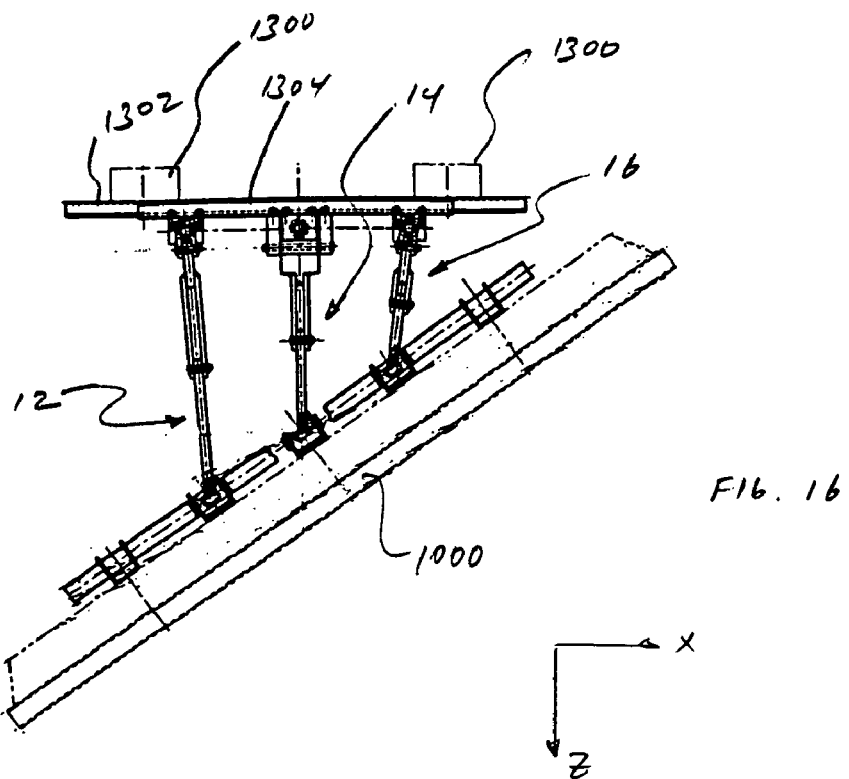
FIG. 16 shows a top view of the mounting system supporting a monitor swiveled to the right side.
Figure 17:
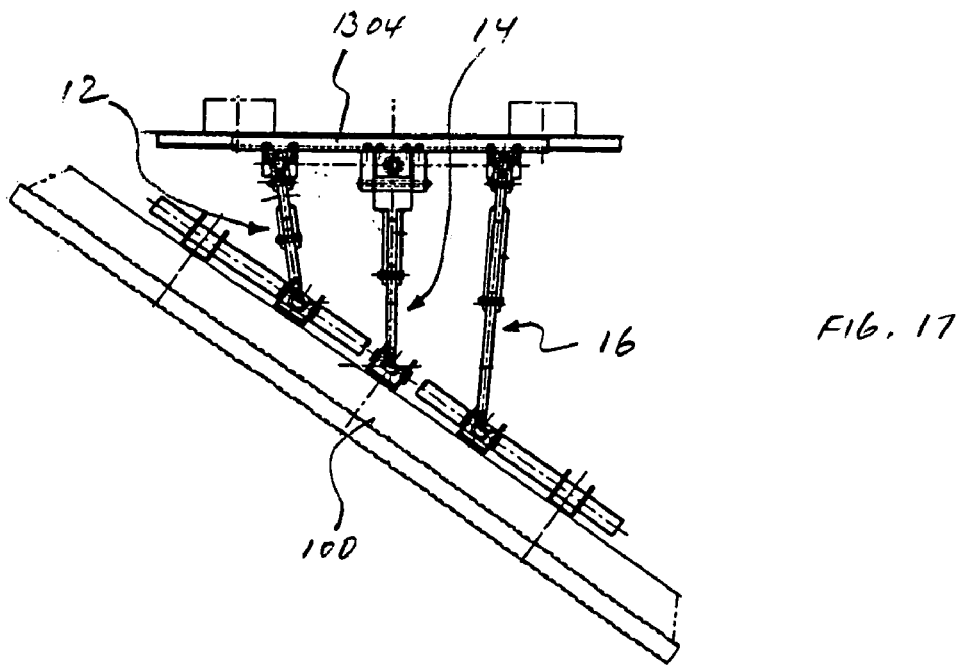
FIG. 17 shows a top view of the mounting system supporting a monitor swiveled to the left side.

FIG. 16 shows a top view of the mounting system 10 where the monitor 1000 is swiveled to the right side or in a counter-clockwise direction along the XZ plane by extending the first actuator 12 further from the base plate 1304 than the third actuator 16 along the Z-axis. FIG. 16 also shows the back plate 1302 mounted to the two wooden studs 1300, and the base plate 1304 hooked onto the back plate 1302. Conversely, FIG. 17 shows the mounting system 10 where the monitor 1000 in swiveled to the left side or in a clockwise direction along the XZ plane by retracting the first actuator 12 closer to the base plate 1304 relative to the third actuator 16. In addition, the second actuator 14 may be extended or retracted relative to the base plate 1304, as discussed in references to FIGS. 14 and 15, to tilt the monitor downward or upwards, respectively, along with the swivel movements.

Referring back to FIG. 1, the direction of the gravitational force may be in the negative Y-direction. The mounting system 10, however, may also operate with the direction of the gravitational force in the positive Y-direction. In this regard, FIG. 18 shows a disassembled perspective view of the mounting system 10 where the three actuators 12, 14, and 16 are inverted relative to the three corresponding actuators shown in FIG. 1 in reference to the X, Y, and Z axes. As such, in FIG. 1, the first link 22 of the second actuator 14 forms a positive slope from its proximal end to the distal end, whereas in FIG. 18, the first link 22 of the second actuator 14 forms a negative slope from its proximal end to the distal end. Again, the three actuators 12, 14, and 16 are substantially similar, except that the second link 24 for the second actuator 14 may be different from the second link for the first and third actuators 12 and 16, as discussed above in reference to FIG. 4.

FIG. 18 shows the first actuator 12 with the first link 22 adapted to pivotally couple to the second link 24 about its midpoint 212. The distal end 40 of the first link 22 is adapted to couple to the round head 208 which is adapted to rotate within the socket 210. The proximal end 28 of the first link 22 is adapted to pivotally couple to the sleeve 38. The proximal end 36 of the second link 24 may be pivotally coupled to the universal pivot joint 30. The sleeve 38 may have a threaded opening to receive the screw 34 so that the sleeve may move along the longitudinal axis of the screw 34. The screw 34 is supported by two support brackets 42 which attach to the base plate 1304. Within each of the support brackets 42 may be a bearing 1800 to smoothly rotate the screw 34. The coupler 214 may couple one end of the screw 34 to the shaft of the motor 32, which is attached to the base plate 1302 through a motor bracket 1802. A limit switch 1808 may be provided on the opposite end of the screw 34 to detect if the sleeve 38 has reached its limitation.

FIG. 18 shows the wall bracket 1302 with a plurality of holes adapted to receive screws that insert into wooden studs or a concrete wall. The base plate 1304 has one or more hooks 1306 that fit over the wall bracket 1302 to attach the mounting system 10 to a wall for example. The bracket system 700 is adapted to pivotally couple to the distal ends of the three actuators 12, 14, and 16, as discussed above in reference to FIG. 7. The first and second brackets 706 and 708 are adapted to slide along the first and second bars 702 and 704 and they have plurality of holes 1806 to attach to the back side of a monitor. A control box 1810 may be provided on the base plate 1304 to control the operation of the three actuators 12, 14, and 16 to swivel and/or tilt the monitor, as discussed in more detail below.

A bellows 1812 may be provided between the base plate 1304 and bracket system 700 to substantially enclose the three actuators 12, 14, and 16 to substantially prevent foreign objects from interfering with the movement of the three actuators. The proximal end 1814 of the bellows 1812 may be attached to the base plate 1304. The distal end 1816 of the bellows 1812 may be coupled to the first and second bars 702 and 704 so that the distal end 1816 of the bellows 1812 may be slide side to side along the longitudinal axis of the first and second bars. In addition, the distal end 1816 of the bellows may slide up and down to allow the bellows to fold uniformly when the mounting system 10 swivels and/or tilts a monitor. Audio and video wires may be passed through the bellows so that wires do not show between the base plate 1304 and the bracket system 700.

FIG. 19 shows that the mounting system 10 may be attached to a stand 1900 and capable of extending the monitor 1000 from a retracted position 1906 to an extended position 1908. The stand 1900 may include upright links 1902 which are supported by a base 1904. The base 1904 may be wide enough to support the weight of the monitor 1000 when it is in the extended position 1908 and in the retracted position 1906. FIG. 20 shows that the base 1904 may include two legs 2000 attached together by two cross-bars 2002. FIG. 21 shows the cross-bars 2002 supporting the upright links 1902 where the base plate 1304 or the reference plane 18 may be attached thereto. The stand 1900 may be placed over a table to allow a user to adjust the viewing angle of the monitor 1000 through a remote control. Alternatively, the mounting system 10 may be attached to a cabinet or recessed within a cabinet.

Figure 22:
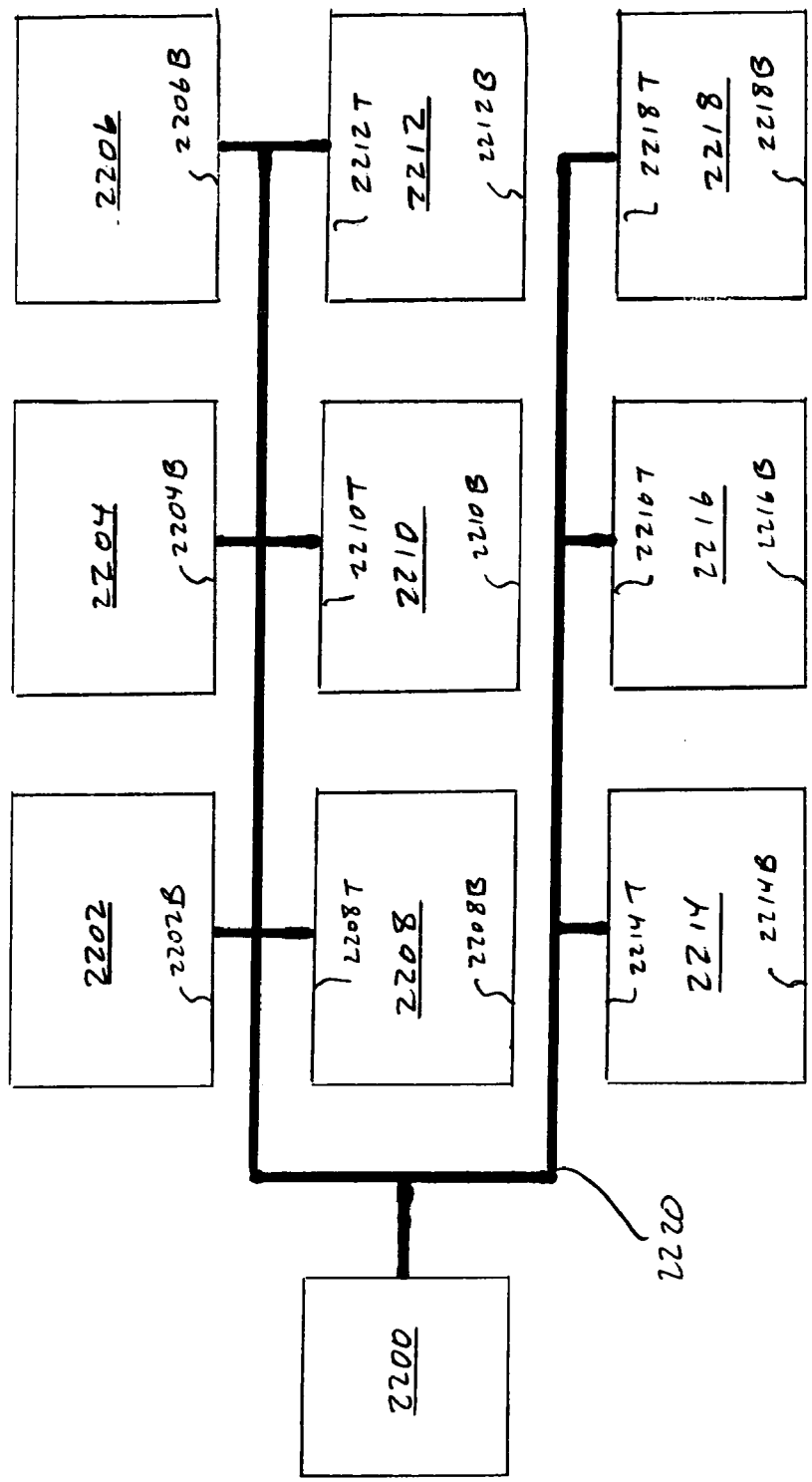
FIG. 22 shows a control system capable of controlling the movement of a plurality of monitors.

FIG. 22 shows a control system 2200 capable of controlling the movement of a plurality of monitors such as monitors 2202 through 2218. The control system 2200 may be communicably link to the plurality of monitors through a communication link 2220. The communication link 2220 may be hard wires or communicate wirelessly. Each of the monitors 2202 through 2218 may be provided with a motorized mounting system such as the mount system 10 discussed above or any other motorize mount that allows the monitor to extend and retract relative to the wall, and swivel (rotating the monitor side to side) and/or tilt (rotating the monitor up and down) the monitor. The control system 2200 may control the viewing angle of each motorized mount system attached to its respective monitor to synchronize the movement of one or more of the plurality of monitors at a predetermined pattern. The movements of the monitors 2202 through 2218 may be synchronized to provide a visual effect when viewing the plurality of monitors 2202 through 2218.

Figure 23:
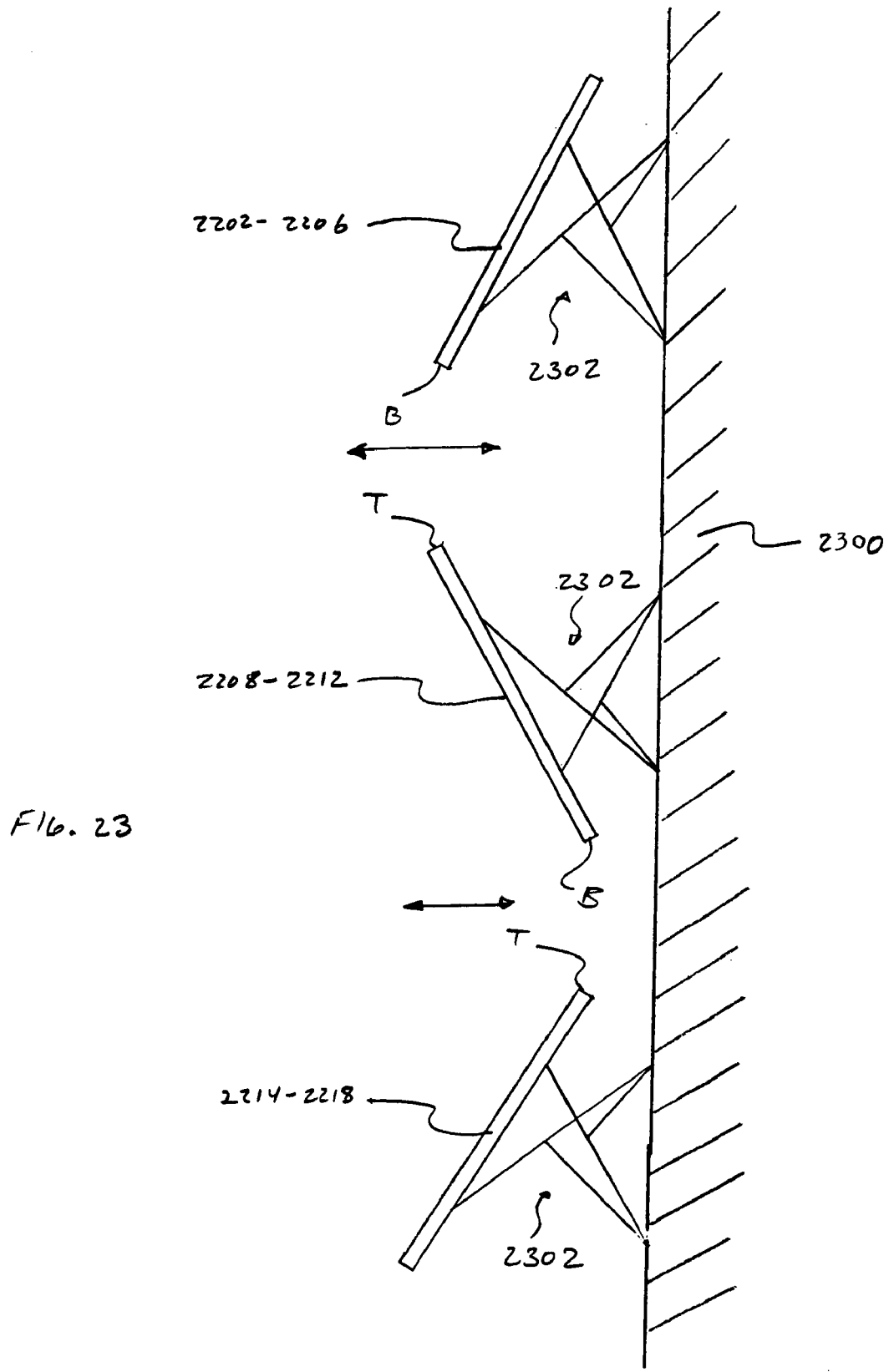
FIG. 23 shows a side view of the plurality of monitors being controlled by the control system of FIG. 22.

FIG. 23 shows a side view of FIG. 22 illustrating each of the plurality of monitors 2202-22018 mounted to a wall 2300 through a motorized mounting system 2302. In this example, the control system 2300 may control the movement of all of the motorized mounting system 2302 to synchronize the movement of all of the monitors to move like a wave. This may be accomplished by tilting the bottom sides 2202B, 2204B, and 2206B of the monitors 2202, 2204, and 2206, respectively, and the top sides 2208T, 2210T, and 2212T of the monitors 2208, 2210, and 2212, respectively, in unison such that as the bottom sides of monitors 2202, 2204, and 2206 are tilted to extend from the wall, the top sides of the monitors 2208, 22010, and 2212 are tilted to extend from the wall 2300 as well, and vice versa. At the same time, the bottom sides of the monitors 2208, 2210, and 2212 and the top sides of the monitors 2214, 2216, and 2218 are synchronized to move in unison such that as the bottom sides of monitors 2208, 22010, and 2212 are tilted to retract toward the wall 2200, the top sides of the monitors 2214, 2216, and 2218 are tilted to retract toward the wall 2200 as well, and vice versa. The control system 2200 may also synchronize the movement of the monitors to move like a wave by swiveling the monitors side to side.

The control system 2200 may control the plurality of monitors 2202 through 2218 to synchronize the movement of one or more monitors with the video being displayed on the monitor. For example, the control system 2200 may control the plurality of monitors to display a tic-tac-toe game. Initially, the control system 2200 may retract all of the monitors against the wall 2300. If a first player picks the center location of the monitor 2210 to place an "O," then the control system 2200 may extend the monitor 2210 from the wall for a period of time, thereby drawing attention to the monitor 2210, and retract the monitor 2210 against the wall. If a second player picks the upper-left location of the monitor 2202 to place an "X," then the control system 2200 may extend the monitor 2202 from the wall for a period of time, and retract the monitor 2202. If one of the players manages to form a straight line across three monitors, then all of the three monitors may extend from the wall then swivel and/or tilt the three monitors, thereby illustrating the winning player.

Figure 24:
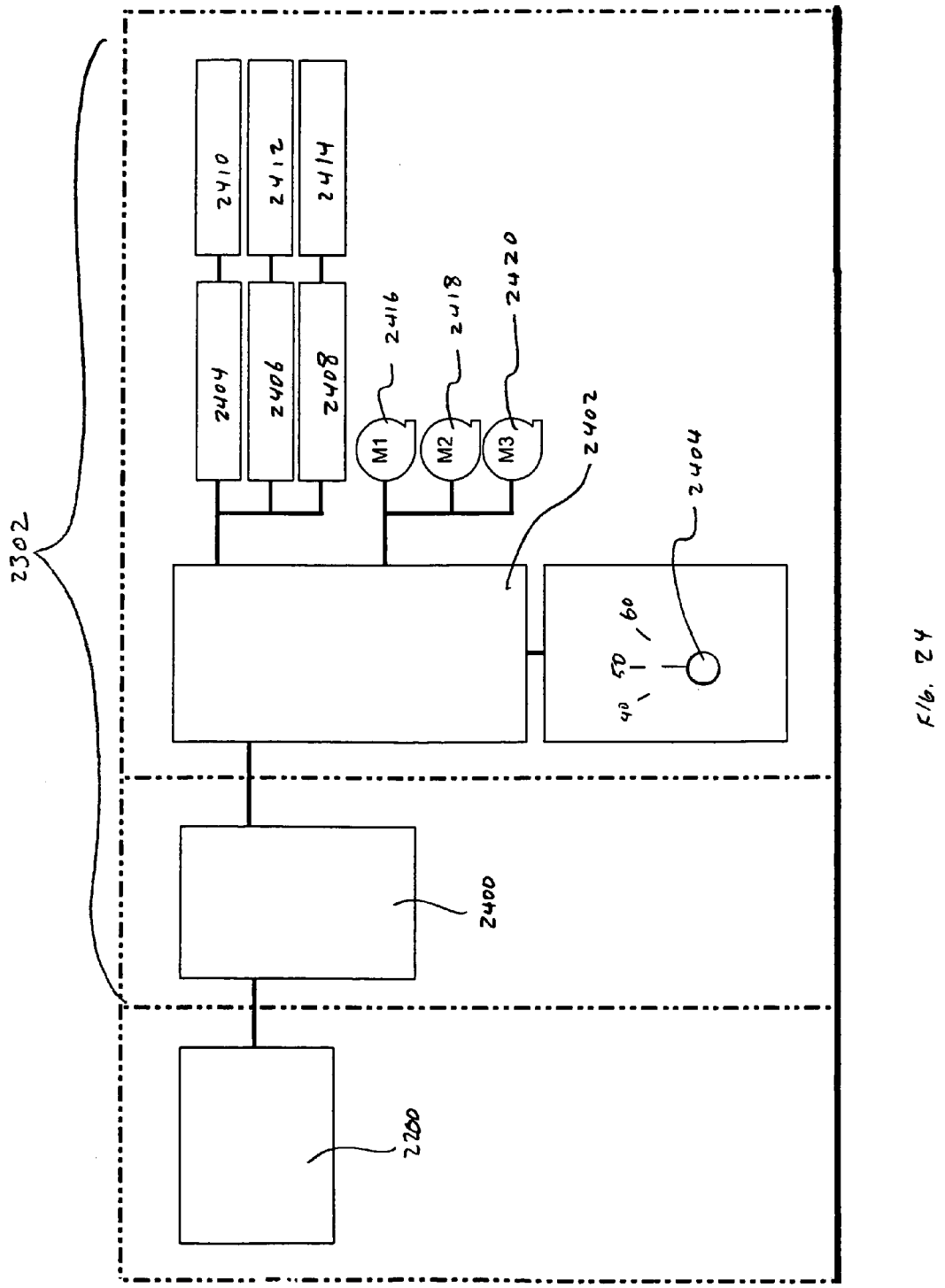
FIG. 24 shows a block diagram illustrating a control system adapted to communicate with a motorized mounting system.

FIG. 24 shows a block diagram illustrating a control system 2200 adapted to communicate with a motorized mount system 2302. In this example, the control system 2200 may be a computer or a processor with a program capable of controlling the movement of the motorized mount system 2302. The motorized mount system 2302 may communicate with the control system 2200 through a variety of ways know to one skilled in the art such as a universal serial bus (USB) I/O card 2400. The USB I/O card 2302 sends the control data from the control system 2200 to a control board 2402, which is communicably coupled to encoder sensors 2404, 2406, and 2408 and home sensors 2410, 2412, and 2414. With reference to FIG. 1, the first actuator 12 may be provided with the encoder sensor 2404 and the home sensor 2410; the second actuator 14 may be provided with the encoder sensor 2406 and the home sensor 2412; and the third actuator 16 may be provided with the encoder sensor 2408 and the home sensor 2414.

The home sensor may detect whether the sleeve on the corresponding screw is at the distal end of the screw that is away from the motor so that the corresponding actuator is in the home or the retracted position. The limit switch 1808 discussed in reference to FIG. 18 may be used as a home sensor or any other known method or apparatus known to one skilled in the art. The encoder sensor may detect the number of rotations by the corresponding screw and communicate the information to the control broad 2402 so it can detect the location of the sleeve as the sleeve moves along the longitudinal axis of the screw. A variety of encoders may be used such as a variable-reluctance sensor.

The control board 2402 may be communicably linked to a first motor 2416, a second motor 2418, and a third motor 2420. In reference to FIG. 1, the first motor 2416 may represent the motor 32 for the first actuator 12, the second motor 2418 may represent the motor 32 for the second actuator 14, and the third motor 2420 may represent the motor 32 for the third actuator 16. Based on the feedback information from the encoder sensors and home sensors from each of the three actuators 12, 14, and 16, the control board 2402 can determine the viewing angle of the monitor. In other words, by detecting the location of the three sleeves 38 on their respective screws 34 for the three actuators, the position of the mounting surface 20 with respect to its distance from the reference plane 18, swivel, and tilt may be determined. If control board 2402 receives a new viewing angle signal from the control system 2200, the control board 2402 may activate one or more of the motors 2416, 2418, and 2420 for the three actuators to adjust the viewing angle of the monitor to the new viewing position.

FIG. 24 also shows that the control board 2402 may be communicably linked to a selector switch 2404 that allows a user to select the size of the monitor that the mounting system 10 is supporting against a wall. For instance, if a user is mounting a 50 inch plasma TV, then the user may position the switch to "50" so that the control board 2402 may limit the swivel and tilt movement of the monitor so that the outer edges of the 50 inch TV does not push against or hit the wall. Accordingly, the swivel and tilt movements of a 60 inch TV may be more limited than the movement of a 42 inch TV. In reference to FIG. 18, the control board 2404 and the selector switch 2404 may be enclosed in the control box 1810.

Figure 25:
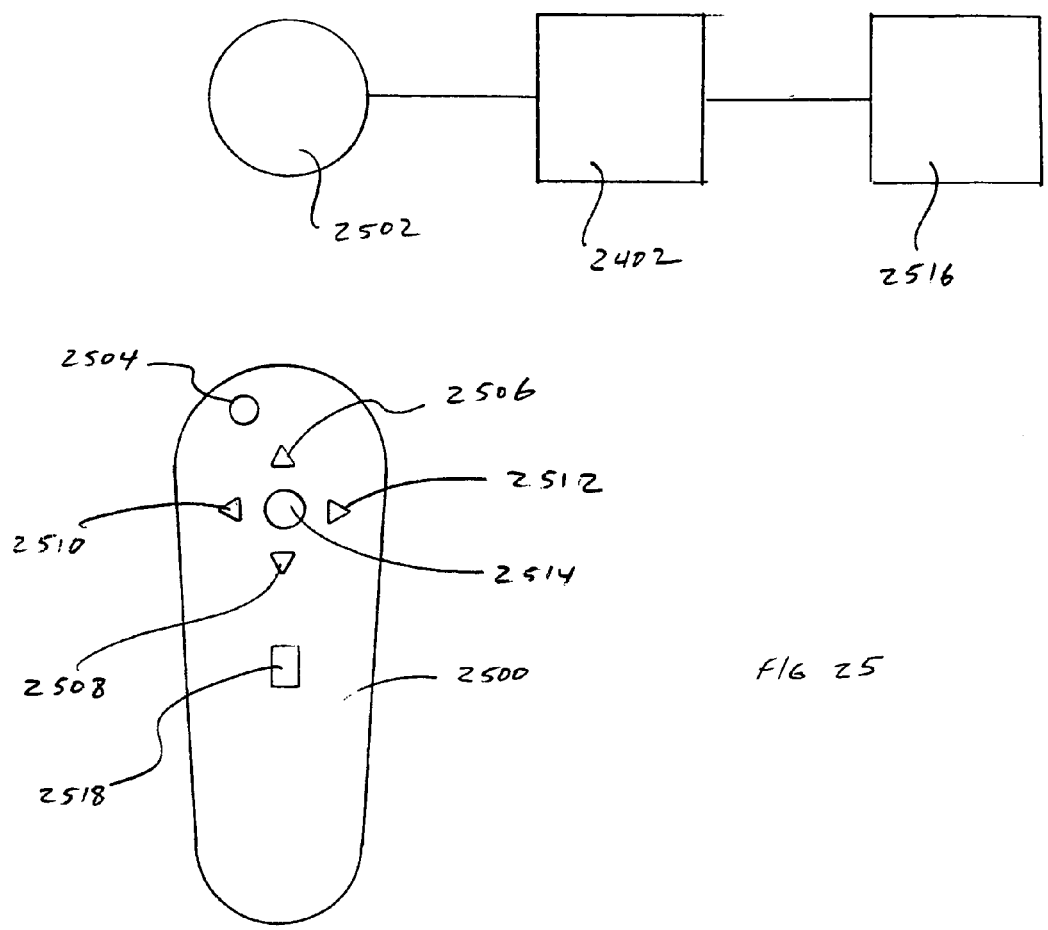
FIG. 25 shows a remote control capable of sending control signals to a receiver to adjust the viewing angle of a monitor.

FIG. 25 shows a remote control 2500 capable of sending control signals to a receiver 2502 to adjust the viewing angle of a monitor. The receiver 2502 is communicably linked to the control board 2402 to process the control signals from the remote control 2500 and activate the motors 2416, 2418, and 2420 to adjust the viewing angle of a monitor accordingly. The remote control 2500 has a power button 2504 to turn on or off the mounting system 10. The remote control 2500 also includes an up button 2506, a down button 2508, a left button 2510, a right button 2512, and an extend/retract button 2514. For instance, from the initial retracted position, if a user pushes the button 2514, then the control board 2402 may extend the monitor 1000 by extending the three actuators to a predetermined position such as the extended position 1908 shown in FIG. 19.

In the predetermined position, the control board 2402 may power the three motors 2416, 2418, and 2420 so that the sleeves are stopped at the midpoint of their respective screws as shown in FIG. 1. This allows the three actuators to further extend or retract their respective distal ends 40 to swivel or tilt the monitor. In reference to FIG. 1, if the up button 2506 of the remote control 2500 is pushed, then the monitor 1000 may be tilted upwards in many ways. One way to tilt up the monitor is to retract the second actuator 14 and extend the first and third actuators 12 and 16. Alternatively, the second actuator 14 may be retracted without moving the first and third actuators 12 and 16 from their predetermined position to tilt up the monitor as shown in FIG. 14.

In reference to FIG. 1, if the down button 2508 of the remote control 2500 is pushed, then the monitor 1000 may be tilted downwards in different ways. One way to tilt down the monitor is to extend the second actuator 14 and retract the first and second actuators 12 and 16. Alternatively, the second actuator 14 may be extended without moving the first and third actuators 12 and 16 from their predetermined positions to tilt down the monitor as shown in FIG. 15.

In reference to FIG. 1, if the right button 2512 of the remote control 2500 is pushed, then the monitor 1000 may be swiveled to the right side in different ways. One way to swivel the monitor to the right side is to extend the first actuator 12 and retract the third actuator 16 without moving the second actuator 14 from its predetermined position as shown in FIG. 16. If the left button 2510 of the remote control 2500 is pushed, then the monitor 1000 may be swiveled to the left side in different ways. One way to swivel the monitor to the left side is to retract the first actuator 12 and extend the third actuator 16 without moving the second actuator 14 from its predetermined position as shown in FIG. 17.

The control board 2402 may be also linked to a memory 2516, where a predetermined desired viewing angle may be stored. The remote control 2500 may also have a preset button 2518 that provides an input signal to the control board 2402 to adjust the viewing angle of the monitor 1000 to the desired stored viewing angle. To preset a desired viewing angle, a user may adjust the viewing angle of the monitor 1000 to a desired position. A user may then activate the preset button 2518 to associate the preset button 2518 to the desired viewing angle and the desired angle may be stored in the memory

2516. Once the preset button 2518 has been programmed, subsequent activation of the preset button 2518 indicates to the control board 2402 to adjust the viewing angle of the mounting surface 20 to the desired viewing angle stored in the memory 2516. Note that the input signals to the control board 2402 may be provided in a variety of ways such as through the Internet, hard wire, computer network, and the like.

The mounting system 10 described above may be used in a variety of applications. For example, monitor, art piece, picture, speakers, camera, stereo equipments, and the like may be attached to the mounting system 10 to reposition the item. The mounting system may be also used in a billboard application, where the viewing angle of the billboard may change as drivers passes by the billboard.

The mounting system 10 may be also used to support a satellite dish. In this application, the control system 2200 may be programmed to follow the path of the satellite so that the satellite dish is substantially facing the satellite as it orbits the earth. The base plate 1304 of the mounting system 10 may be attached to the floor or wall to support the satellite dish. Alternatively, the mounting system 10 may be attached to a vehicle having a satellite dish; and as the vehicle moves, the mounting system 10 may reposition the satellite dish so that the satellite dish is substantially facing the satellite as it orbits the earth.

Yet another application for the mounting system 10 is to support solar panels. In general, the performance of the solar panels may be improved by positioning the solar panels so that they are normal or facing the sun. In this application, the control system 2200 may be programmed to provide control signals to the mounting system 10 to follow the path of the sun to improve the performance of the solar panels. The base plate 1304 of the mounting system 10 may be attached to the floor, wall, or vehicle to support the solar panel. Alternatively, the mounting system 10 may be used to move the apparatus being supported so that the apparatus is not exposed to sunlight. For instance, UV rays from the sunlight may damage the paint of an art piece. As such, the control system 220 may be programmed to provide control signals to the mounting system 10 to move the painting or the art piece away from the direct sunlight. The mounting system 10 may be also attached to a ceiling or other structures to reposition the mounting surface 20 relative to the base plate 1304.

Figure 26:
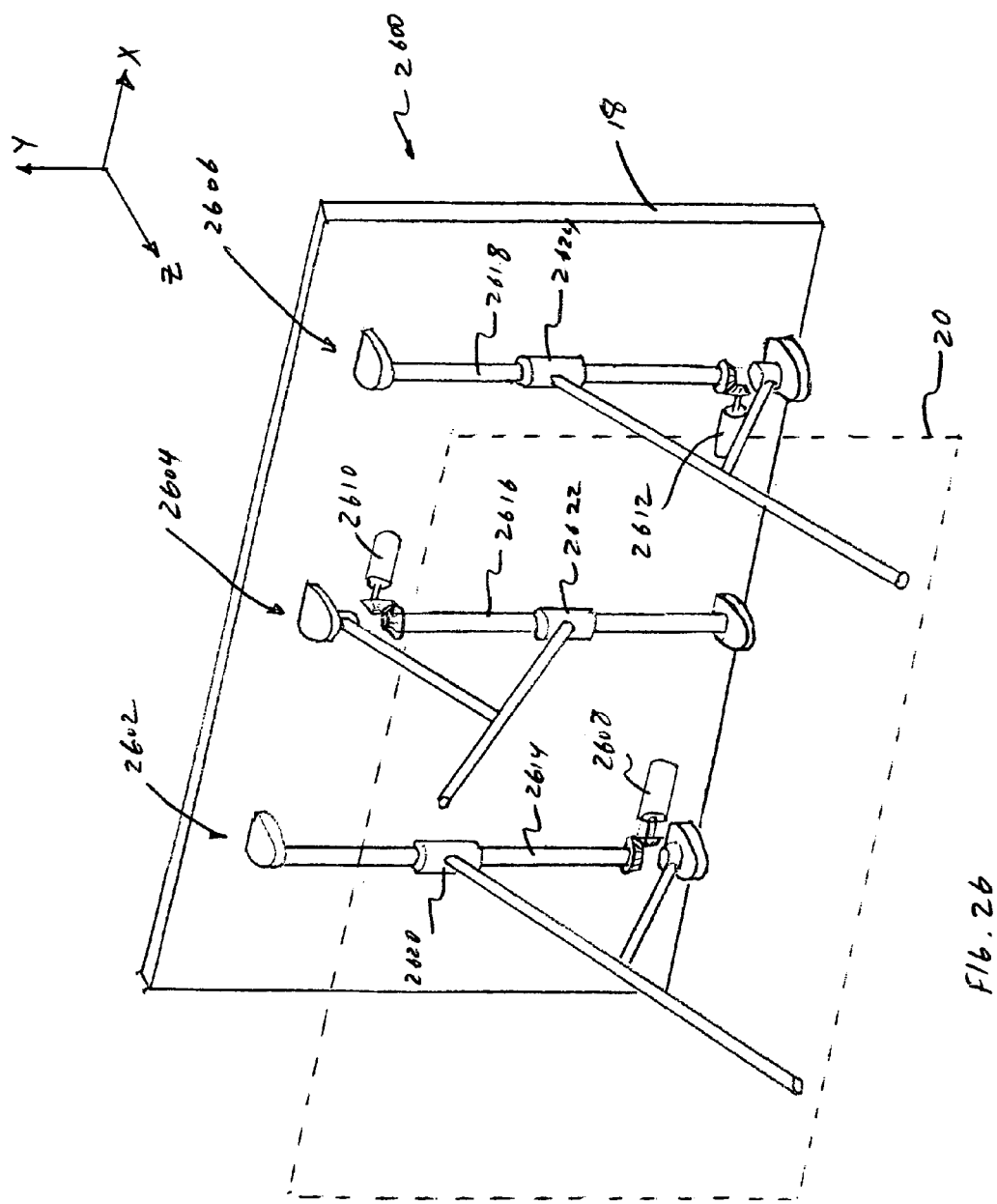
FIG. 26 shows a mounting system with different mount positions for motors relative to their respective screws.

FIG. 26 shows a mounting system 2600 that is similar to the mounting system 10 described above in FIG. 1. The mounting system 2600 includes three actuators 2602, 2604, and 2606 with three motors 2608, 2610, and 2612, respectively. One of the difference between the mounting systems 2600 and 10 is that that the three motors 2608, 2610, and 2612 are located in different positions than the three motors 32 shown in FIG. 1. In the mount system 2600, the three motors 2608, 2610, and 2612 are not aligned with the longitudinal axis of their respective screws 2614, 2616, and 2618. For instance, the three motors 2608, 2610, and 2612 may be substantially perpendicular to the longitudinal axis of their respective screws 2614, 1616, and 2618. This allows the three screws 2614, 1616, and 2618 to be longer so that the three respective sleeves 2620, 2622, and 2624 may have a longer stroke distance, which in turn allows the three actuators 2602, 2604, and 2610 to extend their respective distal ends further away from the base reference plane 18. With the further extension of the distal ends of the three actuators, the monitor attached to the mounting surface 20 may have greater degree of swivel and tilt.

In reference to FIG. 18, the gravitational force may be in the negative Z direction such that the base plate 1304 may be adapted to attach to a floor. In this orientation, the mounting system 10 may be used to lift and tilt the object provided on the mounting surface 20. For instance, the mounting system 10 may support a bed low to the floor to allow easy access to the bed. One the user is on the bed, the bed may be lifted and tilted to a desired position. In particular, the mounting system 10 may support an operating bed in a surgical room. The control mechanism may be on the floor to allow the height, tilt, and swivel of the operating bed to be adjusted by the surgeon through his or her foot. This allows the surgeon to reposition the patient on the bed to make the surgery more comfortable for the patient and the surgeon. For instance, if the surgeon wants to maintain the blood of the patient near the head of the patient, then the surgeon may swivel the bed so that the legs are lifted relative to the head of the patient or vice versa. Still further, if the surgeon wants a better view of a particular organ of the patient during surgery, then the surgeon may tilt or swivel the bed to allow the surgeon to have better access and view of the organ.

Figure 27:
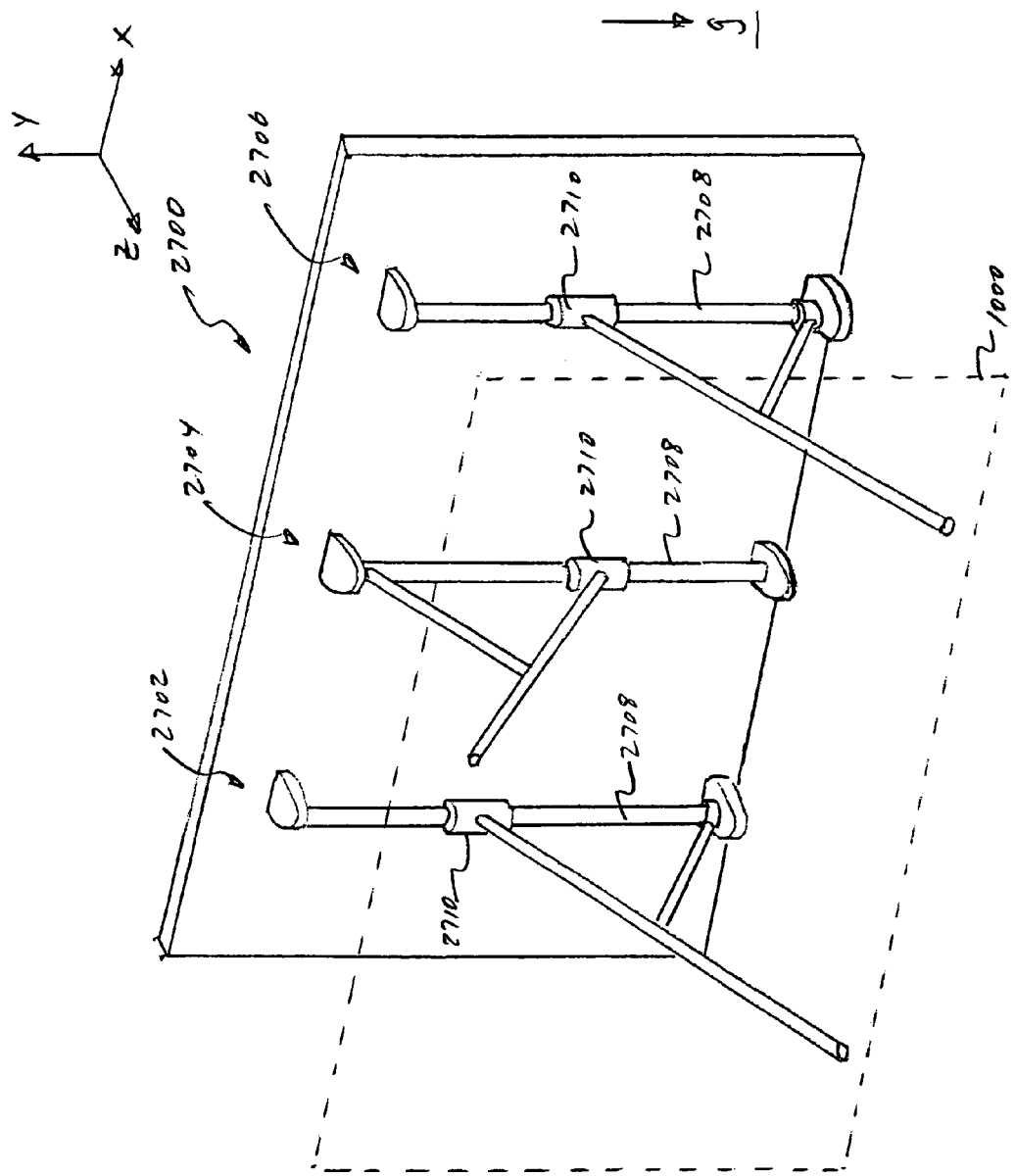
FIG. 27 shows a manual mounting system.

FIG. 27 shows a mounting system 2700 where the viewing angle of a monitor 1000 may be adjusted manually rather than through the use of one or motors as discussed above. The mounting system 2700 may have three actuators 2702, 2704, and 2706, with the middle actuator 2704 being inverted relative the two outer actuators 2702 and 2706. Each of the actuators may have a shaft 2708 and a sleeve 2710. The shaft 2708 may have a smooth outer surface and the sleeve 2701 may have a smooth inner opening adapted to receive the corresponding shaft. To adjust the viewing angle of the monitor 1000, a user may grab the monitor 1000 and reposition it to a desired angle, and release the monitor 1000. Once the monitor 1000 is released, the weight of the monitor applies friction between the sleeves and their respective shafts to hold the monitor in its place.

Figure 28:
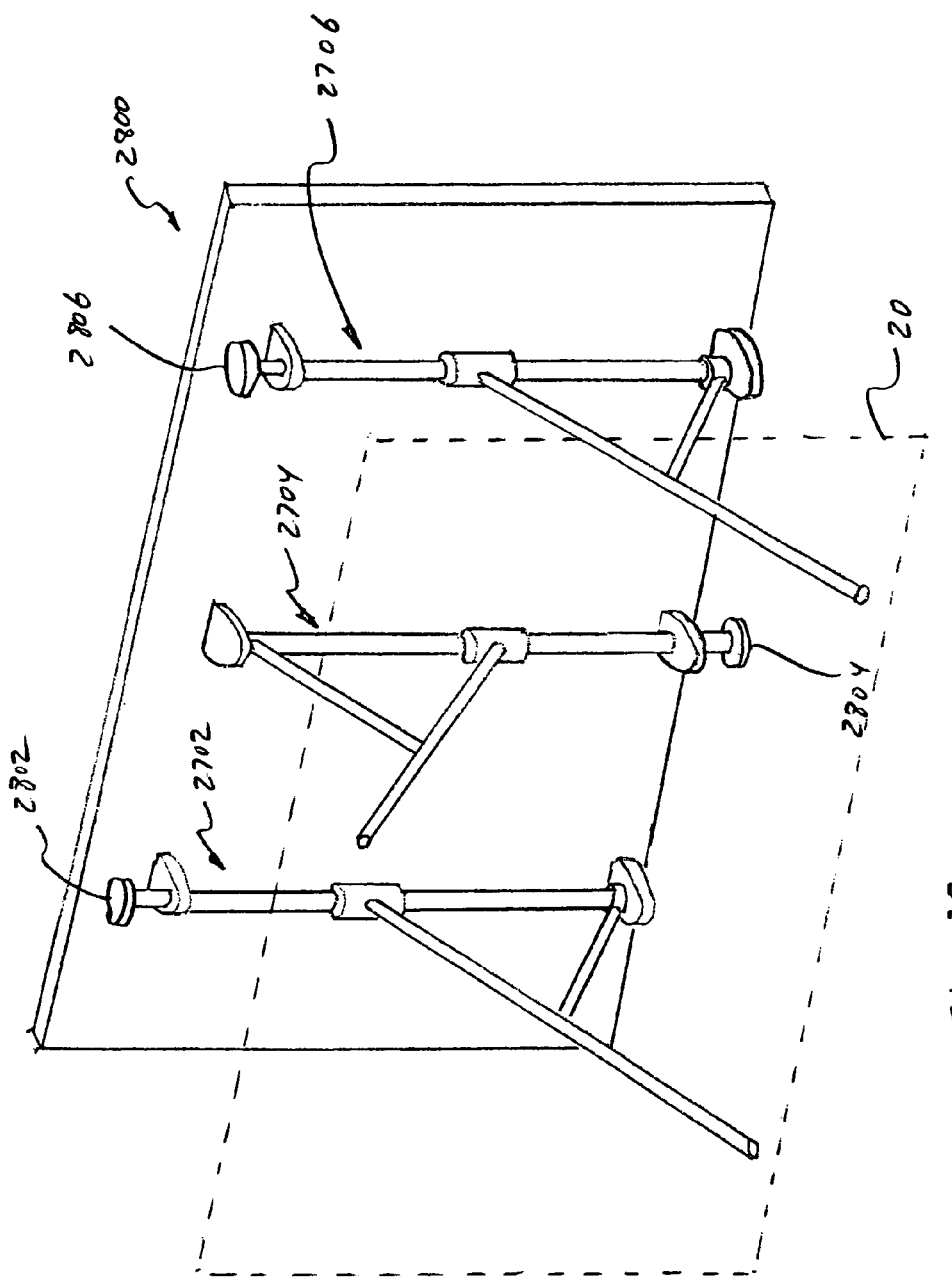
FIG. 28 shows a manual mounting system with cranks.

FIG. 28 shows a mounting system 2800 where the viewing angle of a monitor 1000 may be adjusted manually. The mounting system 2800 is similar to the mounting system 2700 with the addition of manual cranks 2802, 2804, and 2806 on one end of the screws for the three actuators 2702, 2704, and 2706, respectively. The manual cranks may be turned by a hand to extend or retract each of the respective actuators to reposition the mounting surface 20 or the monitor 1000. Alternatively, it is within the scope of this invention to have a motor coupled to each of the cranks to rotate the screws.

FIG. 29 shows a top view of a schematic representation of a mounting system 2900 along XY plane. The mounting system 2900 includes three actuators 2902, 2904, and 2906, similar to the actuators shown in FIG. 1, which are radially spaced apart from each other. In this example, the three actuators may be spaced about 120 degrees apart from each other. The reference plane 18 or the base plate 1304 may be placed on the floor to lift, swivel and/or tilt an apparatus attached to the mounting support 20.

Figure 30:
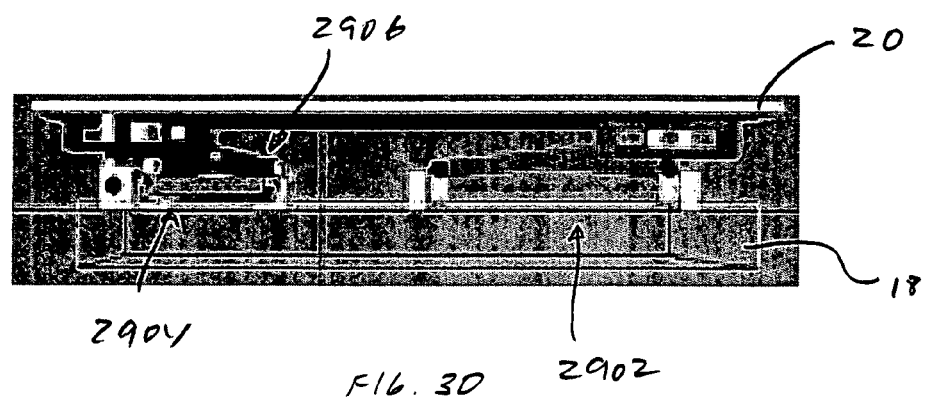
FIG. 30 shows a side view of the mounting system of FIG. 29 in a retracted position.
Figure 31:
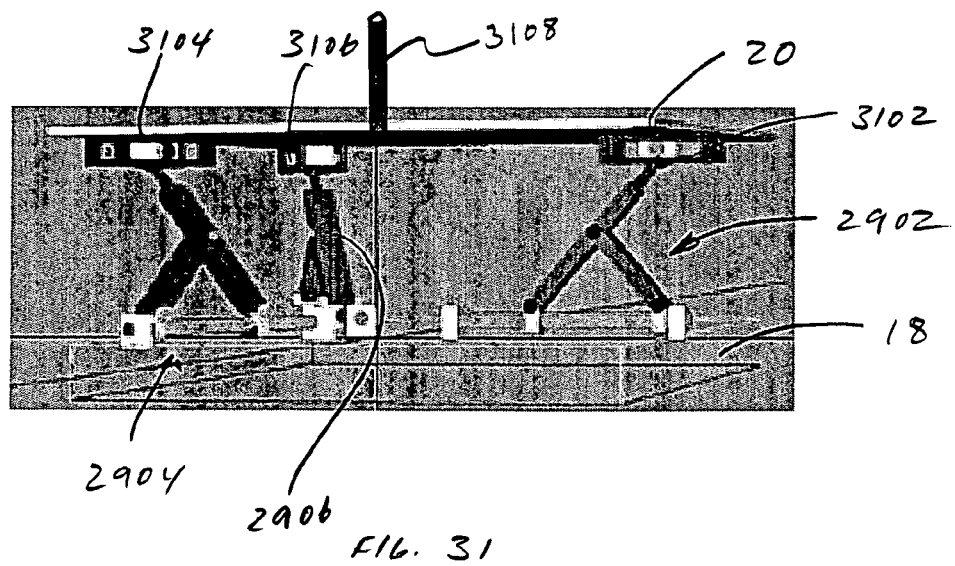
FIG. 31 shows the mounting system of FIG. 29 in an extended position.
Figure 32:
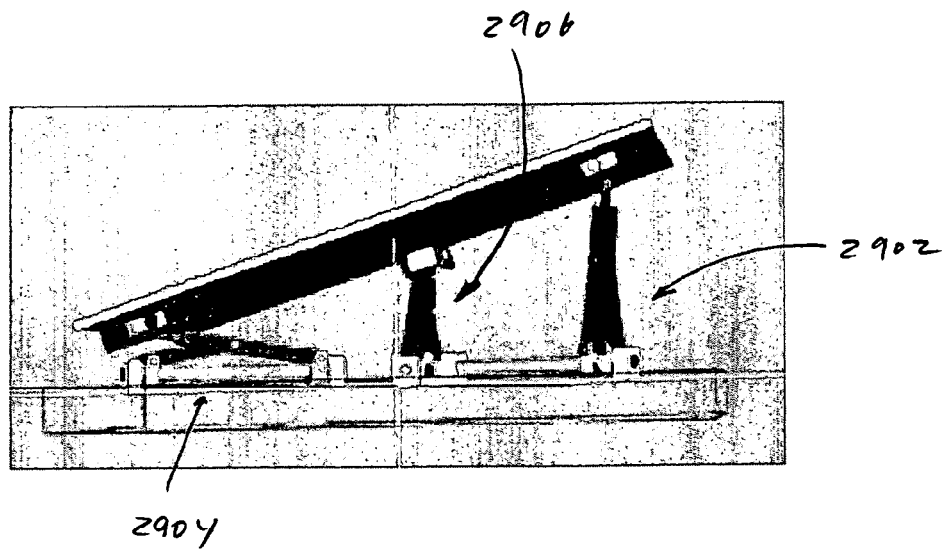
FIG. 32 shows the mounting system of FIG. 29 in a swiveled position.
Figure 33:
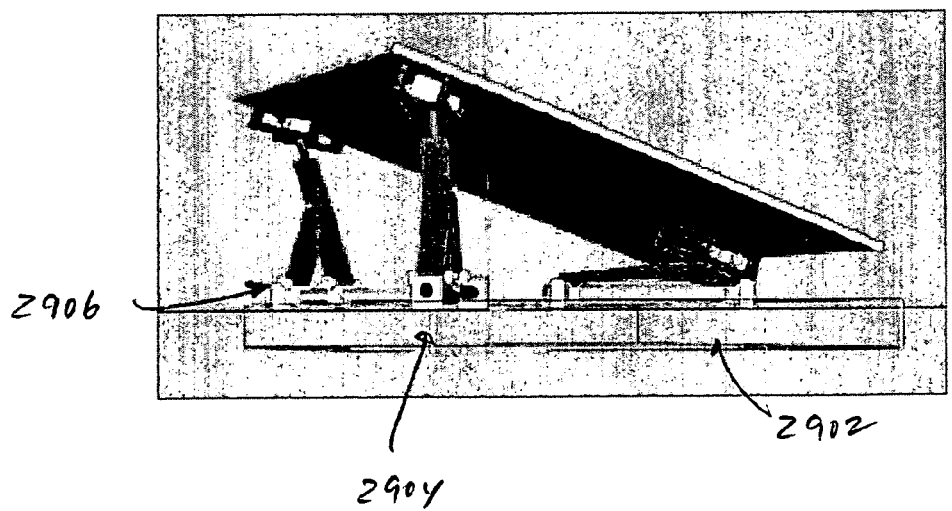
FIG. 33 shows the mounting system of FIG. 29 in a tilted position.

FIG. 30 shows a side view of the mounting system 2900 in a retracted position. FIG. 31 shows the mounting system 2900 in an extended position. The three actuators 2902, 2904, and 2906 are extended from the reference plane 18 about the same distance so that the mounting support 20 and the reference plane 18 may be substantially parallel with respect to each other. Note the distal ends of the three actuators 2902, 2904, and 2906 are able to slide along the elongated slots 3102, 3104, and 3106 to allow the mounting system 2900 to swivel as shown in FIG. 32, and tilt as shown in FIG. 33. With the three actuators arranged in a radial manner as shown above, the position of the mounting support 20 may be better controlled. As such, in applications where a surface needs to be substantially horizontal, the three actuators 2902, 2904, and 2906 may be extended or retracted to provide a substantially horizontal surface or work bench.

In reference to FIGS. 1 and 30, the position of the mounting surface 20 relative to the reference plane 18 may be determined in terms of the distance between the mounting surface 20 and the reference plane, along with the swivel and tilt by determining the location of the sleeves along their respective screws. As such, as shown in FIG. 31, a handle 3108 may be provided protruding from the mounting surface 20 which can be used to extend or retract the mounting surface 20 relative to the reference plane, and tilt and swivel the mounting surface 20. Based on the position of the mounting surface 20 relative to the reference plane 18, the sleeves slide along their respective screws, and by tracking the locations of the sleeves along their respective screws, the position of the mounting surface 20 relative to the reference plane 18 may be accurately determined. The position information may be then transmitted to another motorized device that performs its motorized operations. For instance, a surgical robot with a needle may accurately penetrate a patient based on the position information and deliver the medicine in a precise location. Alternatively, the handle 3108 may be used as a joy stick used in video games and the like.

While various embodiments of the invention have been described, it will be apparent to those of ordinary skill in the art that many more embodiments and implementations are possible within the scope of this invention. For instance, in reference to FIG. 1, additional actuators may be added to the base based plate 1304 to support heavier monitors if necessary. Accordingly, the invention is not to be restricted except in light of the attached claims and their equivalents.

What is claimed is:

1. A mounting system for repositioning a monitor relative to a reference plane, the monitor having a weight, the mounting system comprising:
   a first bracket having a first longitudinal axis, the first bracket having a base between two side walls, the base of the first bracket having a plurality of holes along the first longitudinal axis of the first bracket, and each of the two side walls of the first bracket having an opening;
   a second bracket having a second longitudinal axis, the second bracket having a base between two side walls, the base of the second bracket having a plurality of holes along the second longitudinal axis of the second bracket, and each of the two side walls of the second bracket having an opening;
   a first bar, the openings in the side walls of the first and second brackets adapted to receive and slide along a longitudinal axis of the first bar;
   a second bar adapted to support the first and second brackets such that the second bar is substantially parallel with the longitudinal axis of the first bar;
   a third bracket adapted to support the first bar at a first location, the first location at a predetermined distance relative to the reference plane;
   a fourth bracket adapted to support the first bar at a second location, the second location at the predetermined distance relative to the reference plane; and
   a motorized actuator having a distal end, the distal end adapted to support the second bar at a third location in a slidable manner such that the distal end slides relative to the third location as the distal end extends and retracts relative to the reference plane to pivot the first and second brackets relative to the reference plane, and the third location between the first and second locations such that the first, second, and third locations form a triangular configuration.

2. The mounting system according to claim 1, where the third and fourth brackets substantially support the weight of the monitor when the mounting system is in use.

3. The mounting system according to claim 1, where the triangular configuration is an inverted triangle when the mounting system is in use.

4. The mounting system according to claim 1, where the first and second brackets are adapted to couple to the rear side of the monitor so that a center of gravity of the monitor is position above the third location when the mounting system is in use.

5. The mounting system according to claim 1, where as the distal end of the motorized actuator extends and retracts the third location, the distal end of the motorized actuator slides vertically relative to the third location when the mounting system is in use.

6. The mounting system according to claim 1, where the distal end of the motorized actuator extends and retracts in a substantially perpendicular manner relative to the reference plane to slidably extend and retract the third location relative to the reference plane.

7. The mounting system according to claim 1, where the reference plane is a vertical wall.

8. A mounting system for repositioning a monitor having a weight relative to a reference plane, the monitor having a rear side with threaded openings, the mounting system comprising:
   a first bracket having a plurality of holes along its longitudinal axis, the first bracket adapted to attach to the rear side of the monitor;
   a second bracket having a plurality of holes along its longitudinal axis, the second bracket adapted to attach to the rear side of the monitor;
   a first bar having a longitudinal axis, the first bar adapted to slidably couple to the first and second brackets such that the first bar is substantially perpendicular to the first and second brackets;
   a second bar having a longitudinal axis, the second bar adapted to support the first and second brackets such that the second bar having a longitudinal axis is substantially parallel with the longitudinal axis of the first bar, and the second bar located below the first bar when the mount system is in use;
   a third bracket adapted to support the first bar at a first location, the first location at a predetermined distance relative to the reference plane;
   a fourth bracket adapted to support the first bar at a second location, the second location at the predetermined distance relative to the reference plane, the first and second locations defining a pivoting axis; and
   a motorized actuator having a distal end, the distal end adapted to support the second bar at a third location, the third location between the first and second locations such that the first, second, and third locations form a triangular configuration, the distal end of the motorized actuator adapted to extend and retract the third location relative to the reference plane to tilt the first and second brackets about the pivoting axis.

9. The mounting system according to claim 8, where the third and fourth brackets substantially support the weight of the monitor when the mounting system is in use.

10. The mounting system according to claim 8, where the triangular configuration is an inverted triangle when the mounting system is in use.

11. The mounting system according to claim 8, where the first and second brackets are adapted to couple to the rear side of the monitor so that the center of gravity of the monitor is position above the third location when the mounting system is in use.

12. The mounting system according to claim 8, where the distal end of the motorized actuator slidably engages the third location such that the distal end slides relative to the third location as the distal end extends and retracts relative to the reference plane to pivot the first and second brackets relative to the reference plane.

13. The mounting system according to claim 8, where the distal end of the motorized actuator extends and retracts in a substantially perpendicular manner relative to the reference plane to slidably engage with the third location to extend and retract the third location relative to the reference plane.

14. The mounting system according to claim 8, where the reference plane is a vertical wall.

15. A mounting system for tilting a monitor, the monitor having a rear side with threaded openings, the mounting system comprising:
 a bracket system including a first bracket, a second bracket, and a first bar, each of the first and second brackets having a plurality of holes along their respective longitudinal axis, and the first and second brackets adapted to slide along the first bar such that at least a portion of the plurality of holes in the first and second brackets can match with the threaded openings on the rear side of the monitor;
 a base plate adapted to couple to a wall;
 a third bracket having a proximate end and a distal end, the proximate end of the third bracket coupled to the base plate, and the distal end of the third bracket adapted to pivotably support the bracket system at a first location;
 a fourth bracket having a proximate end and a distal end, the proximate end of the fourth bracket coupled to the base plate, and the distal end of the fourth bracket adapted to pivotably support the bracket system at a second location, the first and second locations defining a pivoting axis, and when the mounting system is in use the pivoting axis substantially parallel with a longitudinal axis of the first bar;
 a motorized actuator having a proximate end and a distal end, the proximate end adapted to couple to the base plate, and the distal end of the motorized actuator adapted to slidably support the bracket system at a third location, the distal end of the motorized actuator adapted to move between a retracted position and an extended position, and as the distal end of the motorized actuator moves between the retracted position and extended position the distal end slides relative to the third location to tilt the bracket system about the pivoting axis.

16. The mounting system according to claim 15, where the third and fourth brackets substantially support the weight of the monitor when the mounting system is in use.

17. The mounting system according to claim 15, where the third location is between the first and second locations such that the first, second, and third locations form a triangular configuration, and the triangular configuration is an inverted triangle when the mounting system is in use.

18. The mounting system according to claim 15, where the first and second brackets are adapted to couple to the rear side of the monitor so that the center of gravity of the monitor is position above the third location when the mounting system is in use.

19. The mounting system according to claim 15, where the motorized actuator extends and retracts in a substantially perpendicular manner relative to the reference plane to slidably extend and retract the third location relative to the base plate.

* * * * *